United States Patent
Cicchiello et al.

[11] Patent Number: 5,914,366
[45] Date of Patent: Jun. 22, 1999

[54] MULTIMODAL EMULSIONS AND PROCESSES FOR PREPARING MULTIMODAL EMULSIONS

[75] Inventors: James V. Cicchiello, Ryebrook, N.Y.; Sun-Yi Huang, Fairfield, Conn.; Joseph J. Kozakiewicz, Fairfield, Conn.; Richard F. Rice, Fairfield, Conn.

[73] Assignee: Cytec Technology Corp., Wilmington, Del.

[21] Appl. No.: 08/755,749

[22] Filed: Nov. 22, 1996

Related U.S. Application Data

[63] Continuation of application No. 08/408,751, Mar. 22, 1995, abandoned, which is a continuation of application No. 08/157,764, Nov. 24, 1993, abandoned.

[51] Int. Cl.$^6$ .............................. C08F 120/60; C08F 2/32
[52] U.S. Cl. ..................... 524/521; 523/221; 524/501; 524/555; 524/922
[58] Field of Search ........................... 524/501, 521, 524/555, 922; 523/221

[56] References Cited

U.S. PATENT DOCUMENTS

| | | | |
|---|---|---|---|
| 3,284,393 | 11/1966 | Vanderhoff et al. | 260/29.6 |
| 3,780,806 | 12/1973 | Bott | 166/75 |
| 3,902,958 | 9/1975 | Breen et al. | 162/164 |
| 4,073,763 | 2/1978 | Tai | 524/922 |
| 4,093,542 | 6/1978 | Dahmen et al. | 210/54 |
| 4,146,499 | 3/1979 | Rosano | 252/186 |
| 4,182,699 | 1/1980 | Fan | 260/29.6 |
| 4,245,070 | 1/1981 | Kemp et al. | 526/75 |
| 4,250,269 | 2/1981 | Buckman | 525/6 |
| 4,254,004 | 3/1981 | Abbey et al. | 260/29.6 R |
| 4,322,330 | 3/1982 | Merz et al. | 523/221 |
| 4,384,056 | 5/1983 | Schmidt et al. | 523/221 |
| 4,395,500 | 7/1983 | Lohr et al. | 523/221 |
| 4,396,752 | 8/1983 | Cabestany et al. | |
| 4,454,047 | 6/1984 | Becker et al. | 210/705 |
| 4,456,726 | 6/1984 | Siol et al. | 524/501 |
| 4,521,317 | 6/1985 | Candau et al. | 252/8.55 D |
| 4,539,361 | 9/1985 | Siol et al. | 524/458 |
| 4,565,836 | 1/1986 | Emerson et al. | 523/346 |
| 4,588,508 | 5/1986 | Allenson et al. | 210/708 |
| 4,619,967 | 10/1986 | Emerson | 524/801 |
| 4,640,954 | 2/1987 | Schnee et al. | 524/516 |
| 4,681,912 | 7/1987 | Durand et al. | 524/827 |
| 4,699,951 | 10/1987 | Allenson et al. | 525/194 |
| 4,780,503 | 10/1988 | Mallya | 524/460 |
| 4,824,877 | 4/1989 | Glover et al. | 523/221 |
| 4,835,206 | 5/1989 | Farrar et al. | 524/457 |
| 4,916,182 | 4/1990 | Azzam | 524/501 |
| 4,956,399 | 9/1990 | Kozakiewicz et al. | 523/223 |
| 4,956,400 | 9/1990 | Kozakiewicz | 523/223 |
| 4,997,759 | 3/1991 | Cibulakas et al. | 435/219 |
| 5,037,863 | 8/1991 | Kozakiewicz et al. | 523/223 |
| 5,037,881 | 8/1991 | Kozakiewicz et al. | 524/812 |
| 5,070,133 | 12/1991 | Miyajima | 524/501 |
| 5,100,951 | 3/1992 | Fillipo et al. | 524/501 |
| 5,109,062 | 4/1992 | Robinson et al. | 524/801 |
| 5,112,500 | 5/1992 | Jones | 210/728 |
| 5,132,023 | 7/1992 | Kozakiewicz et al. | 210/734 |
| 5,169,540 | 12/1992 | Fillipo et al. | 210/728 |
| 5,213,693 | 5/1993 | McGrow et al. | 210/728 |
| 5,405,554 | 4/1995 | Neff et al. | 524/922 |

FOREIGN PATENT DOCUMENTS

| | | |
|---|---|---|
| 0 041 125 | 4/1981 | European Pat. Off. . |
| 0 327 321 | 2/1989 | European Pat. Off. . |
| 52/71392 | 12/1975 | Japan . |
| 57-63200 | 4/1982 | Japan . |
| J57-063200 | 4/1982 | Japan . |
| 61-038700 | 2/1986 | Japan . |
| 62-50120 | 3/1987 | Japan . |
| 63-218246 | 9/1988 | Japan . |
| J02009500 | 4/1989 | Japan . |
| 1489046 | 10/1977 | United Kingdom . |

OTHER PUBLICATIONS

Johnson etal., The Influence of Particle Size on the Viscosity of Synthetic Laxtex–1$^1$, Sep., 1958, pp. 877–882.

Frantisek Skvara, The Effect of Particle Size Distribution on Apparent Viscosity of a Dispersion System, (1971), pp. 9–20.

J.S. Chong, Rheology of Concentrated Suspensions, J. Applied Polymer Science (1971), vol. 15, pp. 2007–2021.

U.S. Patent Application Serial No. 08/018,858, Filing Date, Feb. 12, 1993, Class 528, Group Art Unit 1503, Name Huang etal., Quaternized Tertiary Aminomethyl Acrylamide Polymer Microemulsions with Improved Performance.

U.S. Patent Application Serial No. 08/157,795, Filed, Nov. 24, 1993, Chen etal., Stable Emulsion Blends and Methods for Their Use.

*Primary Examiner*—Andrew E. C. Merriam
*Attorney, Agent, or Firm*—Claire M. Schultz

[57] ABSTRACT

Multimodal emulsions comprising a blend of at least one polymeric microemulsion provide for high solids and low bulk viscosity. Convenient and versitale processes for preparing multimodal emulsions are also provided. Mannich (alk)acrylamide polymeric microemulsions are among the numerous different polymeric microemulsions which may be used to prepare the multimodal emulsions.

42 Claims, No Drawings

MULTIMODAL EMULSIONS AND PROCESSES FOR PREPARING MULTIMODAL EMULSIONS

This is a continuation of application Ser. No. 08/408,751, filed on Mar. 22, 1995, now abandoned, which in turn is a continuation of Ser. No. 08/157,764 filed Nov. 24, 1993, now abandoned.

This invention relates to multimodal emulsions and processes for preparing multimodal emulsions comprising at least one microemulsion.

BACKGROUND OF THE INVENTION

Emulsions have been desirable vehicles for the manufacture and transportating of synthetic polymeric flocculants, particularly high molecular weight polymers. Among other reasons for their popularity, emulsion polymers can be prepared with higher polymer solids and provide substantial cost savings over previous solution polymers. Microemulsions, as taught in U.S. Pat. Nos. 4,956,399; 4,956,400; 5,037,863; 5,132,023 and 5,037,881, provide additional advantages with respect to polymers exhibiting undesirable characteristics even in the context of emulsions, for example Mannich (alk)acrylamide polymeric flocculating agents, by providing for high solids level, reduced debilitating crosslinking and superior performance. Though many polymers are commercially available in powder form, this powder form creates dust problems and the process of dissolving the dry solids, in aqueous medium, is a time-consuming step.

Despite the aforesaid advantages of using emulsion polymers over solution and powder polymers, as a practical matter, emulsions and microemulsions are not universally used because they can exhibit stability problems, settling tendencies and high bulk viscosity which can make handling difficult and costly. These problems were purportedly mitigated in U.S. Pat. Nos. 4,619,967 and 4,565,836 which disclose inverse emulsions containing a single water-soluble polymer in an aqueous phase having two distinct aqueous droplet size distributions. The process in which the patentees teach to prepare these stable emulsions, however, involves an arduous series of steps of applying different shear rates to particular portions of the emulsion to produce two different aqueous droplet size distributions.

The inventors of the instant invention have surprisingly discovered a much simpler, more efficient process for making stable inverse emulsions having two or more different aqueous droplet size distributions or modes. In addition to providing a bimodal or multimodal emulsion having high solids with low bulk viscosity and, with certain polymers, superior flocculation performance, the process of the present invention provides for manufacture simplification and flexibility, allows for greater control over the dispersed phase or aqueous droplet sizes and can be used to prepare emulsion blends containing two or more different polymers. This last advantage is particularly important in view of the known benefits of combining two different water-soluble polymers for water treatment applications.

Japanese patent nos. 20-09500 and 63-218246 disclose the mixing of an inverse emulsion containing a cationic polymer and an inverse emulsion containing an anionic polymer. The resulting emulsion mixtures are described as providing improvements in flocculation performance and benefits in paper making, respectively. But there is no teaching to mix two or more different types of emulsions, one of which is a microemulsion, to produce the desired multimodal emulsion having lower bulk viscosity and higher solids as achieved by the instant invention.

In U.S. Pat. No. 5,213,693 the performance and handling benefits of simultaneously treating waste water with a cationic coagulant polymer and a cationic flocculant polymer are described. There, a particulate mixture containing coagulant polymer beads and flocculant polymer beads is used to facilitate dewatering of a sludge suspension. The beads generally range from about 70 to 1000 microns in size and are made by reverse phase suspension polymerization followed by drying and recovering the dry beads from the liquid. While the patentee mentions that the particulate composition can be a reverse phase emulsion, or more preferably, a reverse phase "substantially dry" dispersion containing the two polymers, there is no mention of using a microemulsion and no teaching to combine two or more inverse emulsions having polymer-containing aqueous phases which differ in their aqueous droplet size distribution. The aqueous droplets in the patentee's emulsions or dispersions are merely disclosed as ranging in size of up to 10 microns. No improvements in the physical properties of the emulsion are even suggested. In contrast, the process of the present invention blends at least two emulsions having aqueous droplet size distributions with different average droplet sizes, one of which results from the microemulsion. Apparently, the different droplet sizes in the microemulsion and second emulsion used in the process of this invention are retained in the resulting emulsion. These resulting bimodal and multimodal emulsions (collectively called "multimodal emulsions") exhibit lower viscosity. The smaller droplets from the microemulsion which are retained in the final multimodal emulsion are particularly beneficial for employing water-swellable or water-soluble polymers which tend to crosslink, such as the Mannich (alk)acrylamide polymers disclosed in, for example, U.S. Pat. No. 4,956,399; in such instances, the debilitating effects of large-scale crosslinking is minimized by the smaller droplets within the bimodal emulsion.

U.S. Pat. No. 4,916,182 ('182 patent) discloses the blending of a water-in-oil emulsion containing a water soluble anionic polymer with a water-in-oil emulsion containing a water soluble cationic polymer to form an emulsion mixture which is used as an adhesive composition for wall covering. After the two emulsions are blended, the resulting emulsion is subject to high shear to create the desired particular size range of about from 2 to 5 microns. There is no teaching to blend two emulsions having distinctly different aqueous droplet size distributions, nor is it suggested that a microemulsion be used to prepare a multimodal emulsion. The emulsion mixtures produced according to the '812 patent do not provide the benefits of the present invention and the benefits of the present invention are not described in the '812 patent.

As described in RubberWorld, 138, 877(1958), multimodal systems having at least two different particle size distributions were observed as providing reduced viscosity. Latices having average particle diameters of 950 Angstroms (Å), 1710 Å and 3250 Å were concentrated alone and in various blend ratios of small, medium and large particles. These water-insoluble styrene-butadiene latices are, however, very different from the emulsion polymers of the present invention, having different applications and posing different problems and, having an aqueous continuous phase, they are not inverse emulsions.

Similarly, U.S. Pat. No. 4,456,726 discloses a method for making a concentrated, bimodal synthetic resin dispersion which lacks structural viscosity. Such resins must be water insoluble under the conditions of preparation and use and the resin dispersions have an aqueous continuous phase; thus they are completely different from the polymers used in the present invention.

U.S. Pat. No. 5,100,951 (the '951 patent) teaches that inverse emulsions containing high molecular weight cationic polymers can be combined with aqueous solutions of lower molecular weight cationic polymers. A different concept of producing the combination of polymers is disclosed in columns 9 and 10 of that patent, which involves emulsifying the solution polymer by adding oil and surfactant and applying intense mechanical agitation. The emulsified liquid polymer is then blended with a commercial emulsion polymer, which also requires intense mechanical agitation. Such intense agitation is not required in the present invention in order to produce a stable multimodal emulsion. The '951 patent also fails to suggest the blending of two or more emulsions having different droplet size distributions, such as a microemulsion and a macroemulsion. Bimodal emulsions are not disclosed on the '951 patent. The patentee in the '951 patent teaches to add additional oil and surfactants to the emulsion polymer before mixing the liquid polymer into the emulsion to achieve a stable blend. The use of additional oil and surfactants, which greatly increases costs, is also avoided in the process of the present invention.

In comparison to known methods, this invention provides a convenient, flexible process for preparing a low viscosity water-in-oil emulsion which can comprise more than one type of polymer. For example, two polymers having two different ionic charges may be combined to attain a system having a desired intermediate charge. Accordingly, the inverse emulsions produced by the process of the instant invention are superior to emulsions in the art because they not only exhibit low bulk viscosity and high solids content, but they can accommodate more than one type of polymer.

Another advantage of the present invention is that the properties of the multimodal emulsion blends can be easily adjusted by simply changing the particular ratios in which the polymeric microemulsion and second emulsion are mixed, or by changing the ratios of microemulsion polymer to the polymer in the second emulsion. This is particularly desirable from a commercial standpoint because it allows for versatility in forming the particular bimodal or multimodal emulsion that is appropriate for treating a particular type of aqueous dispersion. One can, for example, tailor the ratio of the two emulsions that are blended to meet specific requirements and then simply mix the two emulsions accordingly to obtain the optimal bimodal emulsion; this is much simpler than processes used in the art.

In yet another aspect of the present invention, a stable multimodal emulsion exhibiting superior flocculation performance is prepared using a microemulsion comprising a water-soluble polymer-based polymer having functional groups which are capable of continually crosslinking. More preferably, the polymer in the microemulsion is a quaternary dimethyl aminomethyl (alk)acrylamide which is capable of crosslinking at ambient conditions. This microemulsion is blended with a second emulsion, preferably a macroemulsion, containing a polymer which is preferably cationic and a blend stabilizing amount of aldehyde scavenger.

The preferred stable multimodal emulsion blends produced by the present invention exhibit flocculation performance that is just as effective, if not more effective, than a single microemulsion or macroemulsion containing a polymer of identical charge.

SUMMARY OF THE INVENTION

In the process of the present invention, a bimodal or multimodal (collectively referred to herein as "multimodal") inverse emulsion comprising one or more polymers within its discontinuous phase, preferably aqueous, is prepared by: (a) preparing an inverse microemulsion which comprises a water-swellable or water-soluble polymer-containing discontinuous phase that exists in the form of droplets; (b) preparing a second inverse emulsion comprising a water-swellable or water-soluble polymer-containing discontinuous phase in the form of droplets having a volume average diameter which is greater than the volume average diameter of the droplets in the microemulsion with which it is combined; and (c) admixing the microemulsion and second emulsion. Generally, the droplets in the second emulsion are at least about 150 Å greater than the volume average diameter of the droplets in the microemulsion, preferably at least about 300 Å greater, more preferably at least about 1000 Å greater and most preferably at least about 2000 Å greater than the volume average diameter of the droplets in the microemulsion with which it is combined. Generally, the droplets in the microemulsions used in the present invention have a volume average droplet diameter of less than about 2500 Å preferably less than about 2000 Å and most preferably less than 1000 Å. Usually the discontinuous phases (droplets) in the microemulsion and second emulsion are aqueous, though they may consist of 100% polymer. The term "aqueous droplet" as used herein includes droplets containing 100% polymer. The polymers used in the microemulsions and second emulsions used in the process of the instant invention are water-swellable, preferably water-soluble. The polymer in the microemulsion may be the same as or different than the polymer used in the second emulsion.

Also provided are various methods of flocculating suspended solids in an aqueous dispersion using the multimodal emulsions of the present invention.

DETAILED DESCRIPTION OF THE INVENTION

It has been discovered that an inverse (water-in-oil) microemulsion comprising a polymer-containing discontinuous phase in the form of droplets can be combined with a second inverse emulsion comprising a polymer-containing discontinuous phase in the form of droplets to form a multimodal inverse emulsion. The second emulsion can be a macroemulsion or a microemulsion, provided that the droplets in the second emulsion have a volume average diameter that is greater than the volume average diameter of the droplets in the microemulsion with which it is blended. The microemulsions, macroemulsions and second emulsions referred to herein are inverse emulsions. It is observed that the different droplet sizes of the two emulsions are retained in the resulting emulsion such that at least two different droplet size distributions exist in the discontinuous aqueous phase of the final mixture. The two or more different droplet size distributions result in bimodal or multimodal emulsions (i.e. emulsions having two or more modes or droplet size distributions) which have been found to be superior to conventional emulsions inasmuch as they can accommodate substantially more polymer solids, can comprise more than one type of polymer and they exhibit a viscosity which is generally lower than the expected average viscosities of the microemulsion(s) and second emulsion(s) blended to prepare the multimodal emulsion. In many cases, particularly when the viscosities of the microemulsion and second emulsion are somewhat similar, the viscosity of the multimodal emulsion blend will be lower than the viscosity of either the microemulsion or second emulsion used to prepare the multimodal emulsion.

Since the process of this invention can prepare emulsions which include more than one polymer, the multimodal emulsions of this invention may contain a wide variety of combinations of different water-swellable, preferably water-soluble polymers such as, for example, a high molecular weight polymer and a low molecular weight polymer, a cationic polymer and an anionic polymer or a highly charged cationic polymer combined with a lower charged cationic polymer to provide a polymeric emulsion with an intermediate charge. Any combination of different water-swellable or water-soluble polymers may be used in the microemulsions and second emulsions that are blended to produce the multimodal emulsions of this invention. The polymers in the microemulsion and second emulsions used in the present invention may differ in any way, including differing in charge, or in amount of comonomer or they may chemically differ, such as having different functional groups. Polymer combinations for use in the present invention include, but are not limited to, two or more different cationic polymers, two or more different anionic polymers, a cationic and anionic polymer, a cationic and nonionic polymer, an anionic and nonionic polymer, two or more different cationic polymers, two polymers and polymers that are normally incompatible when mixed as solution polymers. Amphoteric polymers may also be included in the microemulsions and/or second emulsions used for practicing the present invention.

In addition to being different, the polymer in the microemulsion may be the same as the polymer in the second emulsion. It may be preferred, for example, to employ a quaternary Mannich (alk)acrylamide (PAM) or a copolymer of acrylamide with (meth)acryloxyethyltrimethyl ammonium chloride in both the microemulsion and second emulsion. More preferably, however, the polymer in the microemulsion differs from the polymer in the second emulsion.

The types of polymers suitable for inclusion in the microemulsion and second emulsions used in the process of the present invention broadly include any type of water-swellable or water-soluble polymer, as these terms are used in the art, including any cationic, anionic, nonionic or amphoteric polymer. Water-soluble polymers are clearly preferred. The polymers employed in the microemulsion and second emulsions used in the process of this invention are formed by emulsion polymerization of water-soluble ethylenically unsaturated monomer or blend of monomers.

Suitable water-soluble monomers for preparing the polymeric microemulsions and second emulsions which are blended to form a stable multimodal emulsion include those that will readily undergo addition polymerization. Preferred cationic monomers include dialkylaminoalkyl (meth)acrylates and dialkylaminoalkyl (meth)acrylamides, including their acid addition or quaternary ammonium salts, diallyl dialkyl ammonium halides, vinyl benzyltrialkyl ammonium salts, polymers formed by the reaction between an epihalohydrin or dihaloalkane and an amine, and the like. Quaternized Mannich or dialkyl amino methylated (alk)acrylamide polymers such as quaternary N-trimethylaminomethylacrylamide prepared by functionalizing (alk)acrylamide or poly(alk)acrylamide are particularly preferred. Specific examples of preferred cationic monomers include, N-dimethylaminomethyl acrylamide; acryloxyethyltrimethylammonium chloride; diallydimethylammonium chloride; 3-acrylamido-3-methyl butyl trimethyl ammonium chloride, 2-acrylamido-2-methyl propyl trimethyl ammonlium chloride, 2-methacryloyloxyethyl trimethyl ammonium methosulfate, 2-methacryloyoxyethyl trimethyl ammonium chloride, 3-methacryloyl-2- hydroxy propyl trimethyl ammonium chloride, 3-acrylamidopropyldimethylamino-(3-trimethyl-2-hydroxylpropyl ammonium chloride), 2-methacryloyloxyethyl trimethyl ammonium chloride; methacryloxyethyltrimethylammonium chloride; dimethylaminoethylacrylate, dimethylaminoethylmethacrylate or mixtures of any of the foregoing. Mixtures of any of the above cationic monomers together with acrylamide or (meth)acrylamide to prepare cationic copolymers are useful and also preferred for the present invention. The instant invention also contemplates homopolymers of the above cationic monomers, as well as copolymers of any of the above cationic monomers, or anionic or nonionic monomers, listed below.

The preferred anionic monomers for use in preparing the microemulsions and/or second emulsions used in the present invention generally are vinyl anionic monomers and include acrylic acid, methacrylic acid, ethacrylic acid and their alkali metal or ammonium salts, vinyl sulfonic acid, 2-acrylamido-2-alkylsulfonic acids where the alkyl group contains 1 to 6 carbon atoms, such as acrylamido 2-methyl propanesulfonic acid or mixtures of any of the foregoing and their alkaline salts. The anionic monomers may be copolymerized with (alk)acrylamide, preferably acrylamide or methacrylamide. Acrylamide copolymers with salts of (meth)acrylic acid may also be prepared by hydrolysis of acrylamide, though attention should be directed to the use of a proper surfactant system capable of withstanding high pH conditions. Especially preferred anionic monomers include acrylic acid salts and 2-acrylamido-2-methyl propane sulfonic acid salts.

The preferred ethylenically unsaturated nonionic monomers for use in the preparation of the microemulsions and/or second emulsions used in the present invention are selected from acrylamide; methacrylamide; dialkylaminoethyl acrylamides; N,N-dialkylacrylamides; N-alkylacrylamides; N-vinyl-acetamide; N-vinyl formamide; N-vinyl pyrrolidone and mixtures thereof. Especially preferred is acrylamide and methacrylamide.

The preferred amphoteric polymers for use in the present invention comprise copolymers of one or more of the foregoing anionic monomers and one or more of the cationic ethylenically unsaturated monomers listed above or monomers which contain both anionic and cationic functionalities. Moreover, small amounts of hydrophobic comonomers can be included in the polymers employed in the microemulsions or second emulsions used in this invention such as styrene, methylmethacrylate, methylacrylates, (meth) acrylate esters containing 1–16 carbons, vinyl acetate and higher esters, acrylonitrile, vinyl chloride and the like. It is understood that the present invention is not limited to the description of monomers, comonomers, polymers and copolymers herein.

Preferred water-swellable or water-soluble polymers for inclusion in the microemulsions used to prepare the multimodal polymeric emulsions of the present invention are cationic polymers, more preferably cationic polymers containing monomeric units selected from quaternary dialkyl aminomethyl (alk)acrylamide; dialkyl aminomethyl (alk) acrylamide; quaternary dialkylaminoalkyl (meth)acrylates; dialkylaminoalkyl (meth)acrylates; quaternary dialkylaminoalkyl (meth)acrylamides; dialkylaminoalkyl (meth) acrylamides; diallyldialkylammonium halides and copolymers of acrylamide or methacrylamide with the foregoing monomeric units. These cationic polymeric microemulsions are preferably blended with a second emulsion, normally a macroemulsion, containing a cationic polymer containing monomeric units selected from quaternary dialkyl aminomethyl (alk)acrylamide; dialkyl aminomethyl (alk) acrylamide; quaternary dialkylaminoalkyl (meth) acrylamides; dialkylaminoalkyl (meth)acrylamides; quaternary dialkylaminoalkyl (meth)acrylates; dialkylaminoalkyl (meth)acrylates diallyldialkylammonium halides; and copolymers of acrylamide or methacrylamide with the foregoing monomeric units.

Generally, however, the preferred emulsion polymer combinations will vary according to the substrate to be treated and the application for which the multimodal emulsion is used. For example, for flocculating suspended solids in municipal sludge or paper sludge, it is preferred to combine a polymeric microemulsion comprising quaternary dialkyl aminomethyl (Mannich) polyacrylamide (PAM), with a cationic polymeric macroemulsion, preferably a macroemulsion comprising polymers made from (meth)acryloxyethyl trimethylammonium halide or copolymers of acrylamide and (meth)acryloxyethyl trimethylammonium halide to form a low viscosity bimodal emulsion. To treat a sludge from coal refuse it would be preferable to combine an anionic polymeric microemulsion with an anionic polymeric macroemulsion.

The ionic polymers used in the microemulsion and second emulsion may also differ in charge. For instance, the polymers can have a wide range of charge densities, from just a few mole percent cationic or anionic functionality up to 100 mole percent of cationic or anionic functionality based on the monomer. A cationic quaternary Mannich PAM contained within the microemulsion may, for example, be blended with a second emulsion, preferably a macroemulsion, containing an anionic (alk)acrylamide-based polymer.

The molecular weights of the polymers used in the microemulsion and second emulsion are not critical to the invention and can range from a few hundred thousand to over ten million. When a high molecular weight polymer and a low molecular weight polymer combination is desired however, it is preferred to employ the high molecular weight polymer in the microemulsion and the low molecular weight polymers in the second emulsion, particularly when the second emulsion is a macroemulsion. The art recognizes that for many flocculation applications for which the emulsion blends are useful, the activity of the polymers is affected by molecular weight.

To prepare the multimodal emulsions according to the present invention, at least one polymeric microemulsion, is blended with at least one second emulsion with just enough agitation to admix the emulsions in a reasonable time. Intense mechanical agitation or shear is not necessary. However, if intense mechanical agitation is used in blending the two or more emulsions, that blending process does not fall outside the scope of the present invention provided that at least one of the emulsions used is a microemulsion.

In combining one or more microemulsions with at least one second emulsion the proportions in which the emulsions are combined is not critical. Generally, at least one percent of a microemulsion should be combined with at least 1 percent of a second emulsion. Preferably, two or more emulsions may be combined in any proportions ranging from 99 to 1 parts microemulsion to second emulsion to 1 to 99 parts microemulsion to second emulsion; more preferably the ratio of microemulsion to second emulsion ranges from 95 to 5 parts microemulsion to second emulsion to 5 to 95 parts microemulsion to second emulsion. It is important that at least one of the emulsions to be blended is a microemulsion, which differs significantly from macroemulsions.

In practicing the process of the instant invention, at least two different inverse emulsions must be combined to form a multimodal emulsion i.e., an emulsion having at least two different droplet size distributions as measured and compared using any method used in the art, e.g., by measuring number average droplet diameter or volume average droplet diameter. The droplet size distributions in the multimodal emulsions of the present invention need not differ by any specific quantative amount, though generally, the maxima of one or more droplet size distributions will differ by at least about 150 Å, preferably at least about 300 Å, more preferably at least about 1000 Å and most preferably at least about 2000 Å as measured by volume average droplet diameter. To obtain a multimodal emulsion, however, one must combine two or more emulsions having different droplet sizes. More specifically, the microemulsion droplet size distribution, as represented by its volume average droplet size, must differ from that of the second emulsion. Volume average droplet diameter will be used herein to distinguish microemulsions from the second emulsions with which they are blended. While there are many known methods of determining the volume average diameter, as the term is used herein, volume average droplet diameter is a value obtained by transmission electron microscopy using the following equation, as applied to a count of droplets which is sufficient to attain an accurate statistical representation of the droplet size distribution:

$$V_a = \sqrt[3]{\frac{\sum X_i^3}{\sum N_i}}$$

Wherein:
$X_i$=the diameter value
$N_i$=the number of droplets of each diameter value
$V_a$=volume average droplet diameter.

In practicing the process of the instant invention, it is important that the second emulsion which is combined with a microemulsion have a volume average droplet diameter which is greater than the volume average diameter of the droplets in the microemulsion. It is preferred that the droplets in the second emulsion be at least about 150 Å, preferably at least about 300 Å greater than, more preferably at least about 1000 Å greater and most preferably at least about 2000 Å greater than the droplets in the microemulsion.

A microemulsion, for purposes of this invention, is generally defined as a thermodynamically stable composition comprising two liquids or phases which are insoluble in each other along with a surfactant or surfactant mixture. Polymeric inverse microemulsions which contain a continuous oil phase and a polymer-containing discontinuous phase (usually aqueous) are prepared from thermodynamically stable monomer microemulsions. Inverse microemulsions have a narrow droplet size distribution and are usually, but not always, optically transparent. The discontinuous polymer-containing phase of microemulsions form droplets or micelles, which are usually aqueous and usually have a volume average droplet diameter which is less than about 2500 Å, preferably less than about 2000 Å and most preferably less than about 1000 Å. Some microemulsions may have a volume average droplet diameter as large as about 3000 Å.

The second water-in-oil emulsion used to prepare the compositions of the present invention is defined as an emulsion which may be a microemulsion or a macroemulsion containing a continuous oil phase and a discontinuous phase, which is in the form of droplets or micelles that are preferably aqueous, and surfactant.

The term macroemulsion as used herein is defined as an emulsion which is not thermodynamically stable and which comprises two liquids or phases which are insoluble in each other along with surfactant or emulsifier; the macroemulsions used in this invention comprise a discontinuous polymer-containing phase, preferably aqueous, in the form of droplets or micelles.

When the second emulsion is a macroemulsion, it may be formed by conventional macroemulsion emulsion polymerization methods. If it is desirable that the second emulsion be a microemulsion, it may be prepared by microemulsion polymerization technique as described below provided that the technique is modified to produce a microemulsion that has aqueous droplets having a volume average diameter which is greater than the volume average diameter of the droplets in the microemulsion with which it is being blended. Again, preferably the volume average diameter of the droplets in the second emulsion (microemulsion) should be generally at least about 150 Å, preferably at least about 300 Å greater than, more and more preferably at least about 1000 Å greater and most preferably at least about 2000 Å greater than the volume average diameter of the droplets in the microemulsion with which it is combined.

The microemulsions used in the process for preparing the multimodal emulsions herein comprise a continuous oil phase, which generally includes a water-immiscible inert organic liquid and a surfactant or surfactant mixture, and a discontinuous phase, preferably aqueous, containing a water-swellable, preferably water-soluble polymer. The ratio of the aqueous phase to the oil phase should be as high as possible and is such that the aqueous phase makes up from about 0.5 to about 3:1 part oil phase. Preferably the ratio approximates 1:1. Most preferably, the microemulsion comprises from about 1 to about 50% weight percent aqueous phase, based on the total weight of the microemulsion. The amount of polymer contained within the discontinuous phase of the microemulsions should also be as high as possible but can generally range from a few percent up to about 100%, weight percent, based on the total weight of aqueous phase. The discontinuous aqueous phase may, therefore, contain 100% polymer and 0% water. The term "aqueous droplet" used for describing microemulsions herein includes droplets containing amounts of up to 100% polymer.

The polymers employed in the microemulsions used to prepare the stable compositions described herein are formed by microemulsion polymerization of certain water-soluble ethylenically unsaturated monomers or blend of monomers. Conventional microemulsion polymerization techniques as disclosed in, for example, U.S. Pat. Nos. 5,037,881; 5,037,863; 4,681,912 and 4,521,317, the disclosures of each of which are incorporated herein by reference, may be employed.

Generally, microemulsion polymerization is produced by (i) preparing a monomer containing microemulsion by mixing an aqueous solution of monomers with a hydrocarbon liquid containing an appropriate amount of surfactant or surfactant mixture to form a water-in-oil microemulsion comprising droplets dispersed in a continuous oil phase and (ii) subjecting the monomer-containing microemulsion to polymerization conditions. It is not necessary to apply energy, e.g., apply shear, into the emulsion to obtain the small droplets, although a microemulsion prepared as disclosed herein, which is also is subject to shear is not beyond the scope of this invention.

The formation of the inverse microemulsion depends on the proper selection of surfactant concentration and the hydrophilic-lypophylic balance (HLB) of the surfact or surfactant mixture. Temperature, nature of the oil phase and composition of the aqueous phase will also affect inverse microemulsion formation.

The one or more surfactants selected should provide an HLB value ranging from about 8 to about 12. The required HLB may vary from this, depending on the nature of the monomers, the nature and proportion of comonomer (if any) and the nature of the oil phase. In addition to the appropriate HLB range, the surfactant concentration must be sufficient to form an inverse microemulsion. Too low surfactant concentrations will not result in the formation of a microemulsion, while excessively high concentrations will increase costs without imparting significant benefit. For example, the minimum amount of sufactant for forming an inverse microemulsion containing anionic polymer will vary depending on the HLB of the surfactant system used; such minimum surfactant amount, based on total weight, is depicted by the hachured portion within the curve representing surfactant concentration verses HLB value in the sole FIGURE in U.S. Pat. No. 4,681,912, see the FIGURE and column 3 lines 22–37 therein. Typical surfactants useful in preparing the microemulsion used for the present invention include anionic, cationic and nonionic surfactants. Preferred surfactants include polyoxyetheylene sorbitol fatty acids, sorbitan sesquiolate, polyoxyetheylene sorbitan trioleate, sorbitan monooleate, polyoxyethylene (20) sorbitan monooleate, sodium dioctylsulfosuccinate, oleamidopropyldimethyl amine, sodium isostearyl-2-lactate, polyoxyethylene sorbitol monooleate or mixtures thereof and the like.

The selection of the organic phase has a substantial effect on the minimum surfactant concentration necessary to obtain the inverse microemulsion and may consist of hydrocarbons or hydrocarbon mixtures. Isoparafinic hydrocarbons or mixtures thereof are most desirable in order to obtain inexpensive formulations. Typically the organic phase will comprise mineral oil, toluene, fuel oil, kerosene, odorless mineral spirits, mixtures of any of the foregoing and the like.

Polymerization of the microemulsion may be carried out in any manner known to those skilled in the art. Initiation may be affected with a variety of thermal and redox free radical initiators, including peroxides, e.g. t-butyl hydroperoxide; azo compounds, e.g. azobisisobutyronitrile; inorganic compounds, such as potassium per sulfate and redox couples, such as ferrous ammonium sulfate/ammonium persulfate. Initiator addition may be affected any time prior to the actual polymerization per se. Polymerization may also be affected by photochemical irradiation processes, such as ultraviolet irradiation or by ionizing irradiation from a cobalt 60 source.

Typically the surfactant and oil are pre-mixed and added to an aqueous solution which contains the monomers and optional comonomers as defined above and any conventional additives such as, but not limited to, chelating agents such as ethylenediaminetetraacetic acid, chain transfer agents, difunctional monomers such as methylene bis (acrylamide), pH adjusters, initiators and the like. Once the aqueous and oil solutions are combined, an inverse microemulsion forms, without the need for shearing.

It has been found that a polymer which crosslinks or is capable of crosslinking, such as a water-soluble polymer-based polymer having functional groups which are capable of continually crosslinking at ambient conditions, including a dialkyl aminomethyl (Mannich) polyacrylamide PAM, are preferably employed in the microemulsion, rather than the second emulsion. Microemulsions are a preferred vehicle for such polymers because the smaller aqueous droplets in the microemulsions tend to reduce undesirable effects resulting from crosslinking of the polymer. This maintains polymer performance while maintaining low bulk viscosity and high solids.

More specifically, in a preferred embodiment of the instant invention a second emulsion comprising any type of water-swellable or water-soluble polymer is blended with a microemulsion comprising a water-soluble polymer-based polymer having functional groups that are capable of crosslinking. These so-called functionalized polymeric microemulsions are described in U.S. Pat. Nos. 4,956,400 and 5,037,863, the disclosures of which are incorporated herein by reference.

The water-soluble polymers which may comprise the basis for these functionalized polymers are those which are capable of reacting with a functionalizing agent to impart a functional group thereto per se or those which contain a group capable of being transformed into a function group and exhibit cross-linking during the reaction with the functionalizing agent, during polymerization, during the transformation or upon aging. Also included are those polymers which are prepared from monomers containing functional groups. Examples of suitable water-soluble polymers include those procured from such monomers as the acrylamides such as acrylamide and methacrylamide;

N-alkyl acrylamides, such as N-methylacrylamide, N-octylacrylamide;

N,N-dialkylaminoalkyl(alk)acrylamides such as N,N-dimethylaminomethyl acrylamide, N,N-dimethylaminopropylmethacrylamide; the hydroxyalkyl(alk)acrylates such as hydroxyethyl acrylate, hydroxyethylmethacrylate;

N,N-dialkylaminoalkyl(alk)acrylates such as N,N-dimethylaminoethyl acrylate and methacrylate, N,N-diethylaminoethyl acrylate and methacrylate; unsaturated primary, secondary and tertiary amines such as allyl amine, diallylamine, N-alkyldially amines, mixtures thereof and the like. Preferably, the preferred functionalized polymers are produced from an (alk) acrylamide; a hydroxyalkyl (alk)acrylate; a N,N-dialkylamino-alky(alk)acrylate; or an allyl amine.

These water-soluble polymers used for making functionalized polymers may be prepared, via known polymerization procedures, by polymerization of the above-enumerated monomers, alone or in conjunction with up to about 99.5% by weight, based on the total weight of the polymer, of additional non-ionic, cationic or anionic comonomers such as acryloylmorpholine; N-vinyl pyrrolidone; N-vinylformamide; the N,N-dialkylacrylamides such as N,N-dimethylacrylamide, N,N-dipropylacrylamide; the N,N-dialkylalkacrylamide such as N,N-dimethylmethacrylamide, N,N-dipropylmethacrylamide; diallyldialkyl ammonium chlorides; the salts and quaternaries of N,N-dialkylaminoalkyl(alk)acrylates, N,N-dialkylaminoalkyl(alk)acryamides etc; acrylic acid; methacrylic acid; fumaric acid; itaconic acid; maleic acid; 2-acrylamido-2-methylpropanesulfonic acid; styrene sulfonic acid, their salts, and the like.

Up to about 10% by weight, same basis, of water-insoluble comonomers may also be included in the base polymers used to prepare the functionalized polymers. Such monomers include styrene; acrylonitrile; methyl acrylate; methyl methacrylate; vinyl acetate; etc.

The functional groups possessed by the polymers of the present invention may be imparted thereto by (1) reacting a water-soluble polymer with an agent capable of adding a functional group thereto or (2) polymerizing a monomer capable of forming a water-soluble polymer in the presence of an agent capable of adding a functional group to the resultant polymer, or (3) polymerizing a monomer already possessing a functional group and capable of forming, alone or in conjunction with another monomer, a water-soluble polymer; or (4) polymerizing a monomer containing a group capable of being transformed into a functional group and capable of forming a water-soluble polymer, (1) alone or in conjunction with another monomer, or (2) after said group has been transformed into a functional group.

In the first instance, a water-soluble polymer is reacted with a material capable of adding a functional group thereto. For example, (1) acrylamide polymers may be reacted with such materials as, aldehydes, e.g., glyoxal, formaldehyde; halogens, e.g., chlorine, bromine and the like. (2) 2-hydroxyethyl methacrylate polymers may be reacted with such materials as epichlorohydrin; glyoxal; water-soluble diisocyanates; and the like (3) N,N-dimethylaminoethyl methacrylate polymers may be reacted with such materials as epichlorohydrin; bischloromethyl ether; 1,4-dichlorobutene-2 and the like; (4)diallyl amine polymers may be reacted with epichlorohydrin, bischloromethyl either; glyoxal; a,a-dichloroxylene and the like.

With respect to the second process discussed above, the above mentioned reactants can be added to the monomers used to prepared the polymer before or during the polymerization to add the functional group to the resultant polymer.

In the third process, any of the above described reactions can be carried out on the monomer first and then the resultant functionalized monomer may be polymerized under known conditions.

In the fourth method of preparation, the monomer being polymerized contains, or is made to contain, a group which is capable of being transformed into a functional group. For example, vinyl acetate may be copolymerized with N-vinyl pyrrolidone, the acetate groups are hydrolyzed into alcohol groups which are converted into functional groups by reaction with glyoxal, epichlorohydrin etc. Similarly, vinyl formamide may be polymerized and then hydrolyzed after which it may be reacted as above described as with the allyl amine monomers.

In addition to those reactions discussed above between, monomers, polymers, functionalizing agents etc., the following combinations of functionalities contained on the polymers can result in polymers which tend to crosslink and fall within the scope of the preferred systems contemplated herein:

amines:epoxides
amines:reactive halogens
amines:aldehydes
amines:esters
amines:silanes
amines:isocynates
amines:acid halides
amines:a,b-unsaturated carbonyl compounds
methylol:amides
methylol:amines
hydroxy:isocyanates
hydroxy:esters
hydroxy:aldehydes
hydroxy:epoxides hydroxy:reactive halogens
hydroxy:acid halides
hyroxy:silanes
aldehydes:amides
aldehydes:thiols
thiois:reactive halogens
thiols:isocynates
thiols:acid halides.

Preferred functionalized polymers for inclusion in either the microemulsions or second emulsions used in the process of the instant invention include glyoxalated poly(alk) acrylamide, and quaternary or tertiary Mannich poly(alk) acrylamide.

The functionalized polymers made by any of the above four procedures should be water-swellable or, preferably, water-soluble, and if it is not, should be reacted with an appropriate substituent to attain water-swellability or water-solubility. The resulting functionalized polymers, which are preferably substituted with at least about 0.5 weight percent of functional groups, are capable of undergoing crosslinking, a phenomena which sometimes detrimentally effects the performance of the polymer over time. When such functionalized polymers are employed in a microemulsion, however, the detrimental effects of crosslinking are significantly reduced, if not overcome. This benefit is maintained in the multimodal emulsions of the present invention, if not enhanced. The multimodal emulsions resulting from combining a microemulsion comprising a functionalized polymer and a second polymeric emulsion having a certain total charge exhibit better performance as a flocculant in sludge dewatering than a single emulsion (e.g., macroemulsion) comprising a polymer having an identical charge, as shown in Example 114.

In another preferred embodiment of the present invention, a microemulsion comprising a dialkyl aminomethylated (Mannich) (alk)acrylamideor quaternized derivative thereof is prepared for blending with a second emulsion comprising any water-swellable or water-soluble polymer. The Mannich (alk)acrylamide is preferably an acrylamide polymer substituted with at least about 1 mole percent of tertiary aminomethyl groups and more preferably a quaternary derivative. In the second emulsion, which is preferably a macroemulsion, it is preferable to use a cationic polymer and more preferably an (alk)acrylamide-based cationic polymer including, but not limited to, cationic polymers containing monomeric units selected from quaternary dialkyl aminomethyl (alk)acrylamide; dialkyl aminomethyl (alk)acrylamide quaternary dialkylaminoalkyl (meth)acrylamides; dialkyl aminoalkyl (meth)acrylamides and copolymers thereof with acrylamide or (meth)acrylamide with a monomer selected from quaternary dialkylaminoalkyl (meth)acrylates dialkylaminoalkyl (meth)acrylates and diallyldialkylammonium halides. Among these, copolymers of acrylamide with quaternary dialkylaminoalkyl (meth)acrylates are particularly preferred and copolymers of acrylamide and methacryloyloxyethyltrimethylammonium salt (including halides and sulfites) are most preferred, particularly those having a 1 to 60 mole percent cationic functionality, based on the monomer, more preferably 1–20 mole percent. Optionally, a difunctional monomer such as methylene bisacrylamide or the like may be incorporated into the monomer solution prior to polymerization. Any cationic polymer containing about 1–60 mole percent, most preferably 1–20 mole percent cationic functionality, based on monomer, may be employed in the second emulsion. Microemulsions containing a cationic polymer preferably a quaternized or tertiarty Mannich PAM, more preferably those polymers containing from about 20 to about 100 mole percent cationic functionality, based on the monomer, more preferably from about 60 to about 90 mole percent cationic functionality, may be combined with the second emulsions comprising any water-swellable or water-soluble polymer including the preferred cationic (alk)acrylamide-based polymers described above. While it is most preferred to include a quaternary Mannich (alk)acrylamide polymer in the microemulsion, the unquaternized Mannich acrylamide polymer is also contemplated within the scope of this preferred embodiment.

In yet a most preferred embodiment of the instant invention, a multimodal composition comprising a blend of two emulsions, one of which is a microemulsion containing in its discontinuous phase a quaternized Mannich PAM and the second, which is preferably a macroemulsion, containing in its discontinuous phase a copolymer of acrylamide and a quaternary dialkylaminoalkyl (alk)acrylate such as (meth) acryloyloxyethyltrimethyl ammonium salt which includes halides and sulfites. The quaternized Mannich PAM should have a cationic charge which differs from the cationic charge on the acrylamide/(meth)acryloyloxyethyltrimethyl ammonium salt. Generally, such preferred blends comprise a quaternary Mannich PAM containing from about 20 to about 100 mole percent cationic functionality, based on the monomer, more preferably from about 60 to about 90 mole percent cationic functionality, based on monomer blended with a second emulsion, preferably a macroemulsion, comprising acrylamide/(meth)acryloyloxyethyltrimethyl salt copolymer containing from about 1 to about 60 mole percent cationic functionality based on monomer, preferably from about 1 to about 20 mole percent cationic functionality, based on the monomer. For example, combinations of a quaternary Mannich PAM microemulsion having a 75% cationic charge with an (alk)acrylamide/(meth) acryloyloxyethyltrimethyl halide copolymer macroemulsion having a 10% cationic charge may be blended at different ratios and with aldehyde scavenger to provide stable emulsion blends having a variety of intermediate charges such as polymer combinations with 55%, 35% and 20% total cationic functionality, based on the monomer. Great cost advantages are attained by preparing this bimodal emulsion in this manner, as opposed to synthesizing a single polymeric emulsion having a 55%, 35% or 20% cationic charge. And, the resulting polymeric emulsion blends may exhibit flocculation performance that is just as effective, if not more effective, than a single microemulsion, macroemulsion or a solution containing a similar polymer of identical cationic charge.

In yet another embodiment of the present invention, microemulsion Mannich PAMs and quaternized derivatives thereof are combined with a second emulsion, preferably a macroemulsion, containing any water-swellable, preferably water-soluble, anionic polymer, most preferably an (alk) acrylamide-based anionic polymer, most preferably an anionic polymer selected from and copolymers of (alk) acrylamide with one or more anionic monomers selected from acrylic acid, methacrylic acid, acrylates and their alkali metal or ammonium salts; vinyl sulfonic acid; acrylamido-2-methyl propanesulfonic acid and their salts; and homopolymers of (meth)acrylic acid, acrylic acid, vinyl sulfonic acid; acrylamido-2-methyl propanesulfonic acid; acrylamido-alkyl sulfonic acid or their alkali metal salts. Preferred anionic polymers employed in the microemulsions used in the present invention contain from about 20 to about 100 mole percent anionic functionality, based on the monomer, more preferably from about 60 to about 90 mole percent anionic functionality, based on monomer. Preferred anionic polymers employed in the second emulsions used in the present invention contain from about 1 to about 60 mole percent anionic functionality based on monomer, preferably from about 1 to about 20 mole percent anionic functionality, based on the monomer.

Multimodal compositions comprising blends of polymeric microemulsions, preferably quaternary Mannich PAM microemulsions, with second emulsions, preferably macroemulsions, containing any nonionic water-soluble polymer such as acrylamide or methacrylamide are also contemplated within the scope of this invention.

In a broad sense, it is also within the scope of this invention to combine any of the following water soluble polymeric emulsions: a cationic polymeric microemulsion, preferably a quaternary Mannich PAM, with non-ionic or anionic polymeric second emulsions and to combine nonionic or anionic polymeric microemulsions with cationic, anionic or nonionic polymeric, preferably (alk)acrylamide-based polymeric, second emulsions.

The Mannich acrylamide polymer-containing microemulsion is prepared by admixing an aqueous solution comprising acrylamide monomer with a liquid hydrocarbon, such as a low odor paraffin oil, which contains a suitable surfactant such as a mixture of polyethylene sorbitol fatty ester and sorbitan sesquioleate. Optionally, additional vinyl comonomers such as those described above, may be included in the above mixture and a polymerization catalyst may be additionally included. The resulting admixture forms a water-in-oil microemulsion which is subject to polymerization conditions, reacted with an effective amount of formaldehyde and a secondary amine, or a complex formed by a formaldehyde and secondary amine, to form an amino methylated polyacrylamide or Mannich PAM.

Formaldehyde compounds useful in preparing Mannich acrylamide polymers are selected from formaldehyde, paraformaldehyde, trioxane or aqueous formalin, and the like. Useful secondary amines are generally selected from those containing 2 to 8 carbon atoms which are aliphatic, cyclic, straight chained, branched or substituted. Preferred secondary amines include dimethylamine, methylethylamine, diethylamine, amylmethylamine, dibutylamine, dibenzylamine, piperidine, morpholine, ethanolmethylamine, diethanolamine or mixtures thereof.

A preferred method of amino methylation involves a process wherein the formaldehyde comprises formalin and the secondary amine comprises dimethylamine. It is also preferred to employ a formaldehyde-secondary amine complex such as N,N-dimethylaminomethyl alcohol. The ratio of formaldehyde to amine is not critical and can range from about 10:1 to 1:10 by mole, respectively. It is generally preferred, however, to use a molar ratio as close to 1:1 as practical. A sufficient quantity of the amine and formaldehyde, or complex thereof, is required to amino methylate and impart tertiary amino methyl groups to the (alk)acrylamide polymer, preferably to impart at least 1 mole percent of tertiary aminomethyl groups. The Mannich PAM may be quaternized by methods known in the art, such as by reacting the Mannich polymers with quaternizing agents such as methyl chloride, dimethyl sulfate, benzyl chloride and the like under known conditions.

The amino methylation or Mannich reaction is preferably performed after microemulsion monomer polymerization by adding formaldehyde and secondary amine to the polymer to form the tertiary aminomethyl substitutent on the polymer backbone. It is also possible, to perform the Mannich reaction at various stages in relation to inverse microemulsion monomer polymerization. For example, one may react the (alk)acrylamide monomer with the formaldehyde and secondary amine prior to the inverse microemulsion formation and before polymerization of the monomers. Also contemplated, is adding the formaldehyde and secondary amine to the aqueous solution prior to polymerizing and then simultaneously polymerizing the (alk)acrylamide monomer and carrying out the Mannich reaction. However, these alternative procedures are less preferred than adding the formaldehyde and secondary amine after inverse microemulsion monomer polymerization is complete. The preparation of Mannich acrylamide polymers and quaternized derivatives thereof is further described in U.S. Pat. No. 5,037,881 which is incorporated herein by reference.

Quaternized Mannich (alk)acrylamide polymers are preferably heat treated in their microemulsion form, before being blended with the second emulsion. Heat treatment is conducted according to the procedure in U.S. application Ser. No. 08/018,858, filed on Feb. 12, 1993, which is incorporated herein by reference. Generally, heat treatment is performed by (a) adding to the untreated quaternized Mannich PAM microemulsion, with agitation, an aqueous solution containing an acid such that the pH range of the resulting quaternized Mannich PAM microemulsion is from about 3.6 to about 4.8; preferably about 3.8 to about 4.6, and adding a formaldehyde scavenger, (b) adjusting the polymer content of the aqueous phase to about 10 to about 45 wt. percent, preferably about 20–40, wt. percent, and (c) heating the quaternized Mannich PAM polymer microemulsion obtained in step (b) to a temperature of from about 40 to about 80° C. for from about 3 to about 20 hours.

Any water-soluble acid may be used in this heat treating procedure. The acid is preferably employed as an aqueous solution and preferably comprises (i) an organic carboxylic acid, an inorganic acid or a combination thereof in an amount sufficient to provide a pH of from about 3.6 to about 4.8 in the resulting emulsion; (ii) from about 0.01 to about 30 mole percent of a formaldehyde scavenger based on the total moles of quaternized Mannich PAM microemulsion; and (iii) water, if necessary, in an amount such that when added to the microemulsion the resulting aqueous phase contains from about 10 to about 45 weight percent of quaternized amino methylated PAM microemulsion.

The acid, preferably an organic carboxylic acid, inorganic acid and/or combination thereof, is used in sufficient quantity such that the resulting pH of the microemulsion is from about 3.6 to 4.8, preferably 3.8–4.6. The quantity of each individual acid or combination of acids employed in the stabilized solution is determined by acidity (pKa) of each individual acidic component. The total amount of acid used in the practice of the present invention may vary from about 1 to about 40 mole percent based on the total number of moles of polymer present in the microemulsion. The only limitation on the acid used is that it be inert with respect to the ingredients which are present in the microemulsion system, i.e. emulsifier polymer, oil and other generally added ingredients.

Acids which may be employed for use herein include, but are not limited to, mono and multifunctional carboxylic acids such as acetic, maleic, fumaric, formic, acrylic, succinic, lactic, citric and the like; inorganic acids such as sulfurous, phosphoric, phosphorous and sulfuric acids as well as salts of these acids such as the alkali salts of sulfurous acid, aluminum sulfate, aluminum chloride, sodium sulfate and the like. Any combination of the above-mentioned acids may be employed as long as the quaternized Mannich PAM microemulsion has, after the addition of the stabilizer solution, a pH within the range set forth above.

The formaldehyde scavengers useful for stabilizing the microemulsion are those water-soluble compounds which have the capability to react with formaldehyde. The source of formaldehyde in the quaternized Mannich (alk) acrylamide polymer microemulsion of the present invention results, in theory, from unreacted formaldehyde or from labile formaldehyde components that release formaldehyde. The quantity of formaldehyde scavenger used in the present invention ranges from about 0.01 to about 30 mole percent, preferably ranging from about 0.6 to about 15 mole percent, based on the moles of polymer in the microemulsion.

Typical formaldehyde scavengers are those known in the art, and include, but are not limited to, urea, substituted ureas such as ethylene urea, guanidine salts, dicyandiamide, sulfurous acid and any of its alkali metal salts such as sodium bisulfite, sodium metabisulfite and the like, as well as phosphorous acid and mixtures of any of the foregoing.

The quantity of water preferably used in the stabilizer solutions is selected such that the resulting aqueous phase of the microemulsion contains from about 10 to about 45 weight percent polymer, based on the weight of the total aqueous phase, preferably from about 15–40 weight percent, same basis.

The formaldehyde scavenger and the acid, preferably in the form of an aqueous solution, thereof, as described hereinabove, are then added to the microemulsion with mixing. The resulting microemulsion is then heated to a temperature ranging from about 40 to about 80° C. for a time of from about 3 to about 20 hours. The heating step can be carried out immediately after addition of the acid, scavenger and/or water, however, it is also possible to delay the heating up to the desired time of use of the microemulsion as a flocculant.

The stabilized quaternized Mannich PAM microemulsion obtained after the heating step will successfully invert when added to water independent of the temperature or pH of the water used. The aforesaid heat treating step is preferred, but not essential, for microemulsions comprising quaternary Mannich (alk)acrylamide polymers which are used for preparing emulsion blends. When heat treating is not performed, the inversion of the emulsion blends are more dependent on pH and temperature. When the microemulsion used for preparing the emulsion blend does not contain formaldehyde, as with other polymers, then the heat treating step described above need not be performed.

Another preferred embodiment is directed to a multimodal emulsion comprising a blend of at least two emulsions wherein at least one emulsion is a microemulsion containing a water-swellable or water-soluble glyoxalated (alk) acrylamide.

Microemulsions containing glyoxalated (alk)acrylamide polymer are known in the art and disclosed, along with their methods of preparation, in U.S. Pat. No. 4,954,538 the disclosure of which is incorporated herein by reference.

It is also preferable to stabilize the multimodal emulsion blend by adding, to either the blend of microemulsion and second emulsion, to the microemulsion or to the second emulsion before blending, a blend stabilizing amount of aldehyde scavenger. This treatment is more particularly used according to the disclosure in U.S. patent application Ser. No. 08/157,795 (Attorney Docket No.: 32,319), filed Nov. 24, 1993 which is concurrently filed herewith and incorporated herein by reference. Generally, the addition of a blend stabilizing amount of aldehyde scavenger is employed when the multimodal emulsion blend contains: 1) a polymer, typically an (alk)acrylamide-based polymer, capable of deteriorating as a result of reacting with any aldehyde compounds, and 2) a polymer, more specifically called a functionalized polymer, which contains, generates or is capable of generating an aldehyde such as formaldehyde, acetaldehyde or glyoxal. More preferably, an aldehyde scavenger is used when a quaternary Mannich Pam, Mannich PAM or glyoxalated PAM microemulsion is blended with a second emulsion comprising any (alk)acrylamide-based polymer, preferably a polymer containing monomeric units selected from dialkyl aminomethyl (alk)acrylamide; quaternary dialkyl aminomethyl (alk)acrylamide; quaternary dialkylaminoalkyl (meth)acrylamides, dialkylaminoalkyl (meth)acrylamides; acrylamido-2-alkyl sulfonic acid or copolymers of acrylamide or methacrylamide with any of the foregoing monomers or a monomer selected from quaternary dialkylaminoalkyl (meth)acrylates and diallyldialkylammonium halides.

The term "aldehyde scavenger", as used herein, means and includes those compounds, preferably water-soluble compounds, which have the capability of reacting with any aldehyde, such as formaldehyde, acetaldehyde, glyoxal, and the like, though preferably formaldehyde. Such aldehyde compounds are present in or generated from the microemulsion which is blended with the second emulsion to produce the stabilized composition and they result, in theory, from unreacted aldehyde or from components that release aldehyde. Suitable aldehyde scavengers include those known in the art, and include, but are not limited to, urea, substituted ureas, such as ethylene urea, guanidine salts, dicyanamide, dimedone(5,5-dimethyl-1,3-cyclohexanedione), sulfurous acid and any of its alkali metal salts such as sodium bisulfite, sodium metabisulfite and the like, as well as phosphorous acid, and mixtures of any of the foregoing. Urea, substituted ureas and dimedone and mixtures thereof are preferred.

"Blend stabilizing amount" generally refers to the amount of aldehyde scavenger necessary for stabilizing the multimodal emulsion blend, i.e. maintaining performance of the polymer activity in the emulsion blend. Preferably, "blend stabilizing amount" means the amount of aldehyde scavenger necessary for reducing polymer degradation (e.g. through cross-linking or otherwise), primarily the (alk) acrylamide-based polymer. This amount is provided by adding from about 0.1 to about 10 weight percent aldehyde scavenger, based on the total weight of the composition, to the emulsion blend. The three methods of adding the aldehyde scavenger to the blend are described below. The quantity of aldehyde scavenger used in the present invention may generally be as low as about 0.1 weight percent, based on the weight of the stabilized composition, preferably at least about 0.7 weight percent, based on the weight of the stabilized composition. Generally amounts ranging up to about 10.0 weight percent, preferably up to 5.0 weight percent, based on the weight of the stabilized composition, may be used. While higher amounts of aldehyde scavenger are also effective, such amounts are usually less desirable since the benefits are usually offset by cost considerations. Blend stabilizing amounts of aldehyde scavenger used in the present invention preferably range from about 0.7 to about 5.0 weight percent, based on the total weight of the stabilized composition. However, these amounts may vary as discussed below, depending upon the microemulsion used. The blend stabilizing amount of aldehyde scavenger may be added neat or it may be added as an aqueous solution, usually about a 40 to 60 weight percent solution.

The stabilized compositions of the present invention, which comprise a blend of at least two emulsions, may be prepared by three different methods. They are prepared by:

(a) preparing a microemulsion containing a water-swellable or water-soluble functionalized polymer;

(b) preparing a second emulsion containing a water-swellable or water-soluble (alk)acrylamide-based polymer;

(c) admixing the microemulsion and the second emulsion to form a blend of emulsions; and (d) adding a blend stabilizing amount of aldehyde scavenger to the emulsion blend.

Alternatively, instead of adding the aldehyde scavenger to the emulsion blend, the stabilized multimodal emulsions of the present inventions may be prepared by:

(a) preparing a microemulsion comprising a water-swellable or water-soluble functionalized polymer;

(b) preparing a second emulsion comprising a water-swellable or water-soluble (alk)acrylamide-based polymer and a blend stabilizing amount of aldehyde scavenger; and (c) admixing the microemulsion and the second emulsion.

A third method of preparing the stable multimodal emulsions of the present invention is by:

(a) preparing a microemulsion comprising a water-swellable or water-soluble functionalized polymer;

(b) preparing a second emulsion comprising a water-swellable or water-soluble (alk)acrylamide-based polymer;

(c) adding a blend stabilizing amount of aldehyde scavenger compound to the microemulsion resulting from step (a).

(d) admixing the microemulsion resulting from step (c) and second emulsion to form a blend of emulsions.

It is preferred to add the aldehyde scavenger to the second emulsion, particularly if it is a macroemulsion, and then admix the microemulsion thereto. While a blend stabilizing amount of aldehyde scavenger may be added to the second emulsion at any stage, it is preferred to add it to the aqueous monomer phase of the second emulsion before polymerization for manufacturing and handling reasons and to maximize the solids content. In contrast, while a blend stabilizing amount of aldehyde scavenger may be added to the functionalized-polymer containing microemulsion prior to blending, the alddehyde scavenger should not be added to the aqueous monomer phase of that microemulsion, but must be added to the microemulsion after it has been prepared and functionalized. This is to assure that sufficient aldehyde scavenger enters the droplets of the second inverse emulsion for stabilization.

It is also preferred to heat treat the microemulsion when it contains a quaternary Mannich PAM, Mannich PAM or glyoxalated PAM before mixing with the second emulsion and to add a blend stabilizing amount of aldehyde scavenger to the emulsion blend, preferably directly to the second emulsion prior to blending. The method of heat treating, described below, involves the addition of an acid to adjust the pH to about 3.6 to 4.8 and a formaldehyde scavenger and heating the microemulsion to a temperature within a range from about 40° to 80° C. for about 3 to 20 hours. The amount of formaldehyde scavenger that is added to the microemulsion in this heat treating step may alter the blend stabilizing amount of aldehyde scavenger that is added to the second emulsion or the emulsion blend.

While heating and adjusting the pH of the microemulsion is critical to heat treating the microemulsion, the present method of preparing the stabilized blend of emulsions does not require heating or pH adjustments. Generally and preferably, the microemulsion, which is optionally heat treated, is simply mixed with the second emulsion containing a blend stabilizing amount of aldehyde scavenger at ambient temperature and with modest mixing. Less preferably, the aldehyde scavenger may be added to the blend of the microemulsion and second emulsion or to the microemulsion prior to blending at ambient temperatures and with modest mixing conditions. The above procedure applies regardless of whether the second emulsion is a macroemulsion or a microemulsion.

The art recognizes that certain aldehyde scavengers may not be effective at certain pH's, i.e., that they do not react with formaldehyde, and therefore, even though the stabilization method of the instant invention does not necessitate any specific pH range, it is important that the particular aldehyde scavenger used to prepare the stable emulsion blend be effective at the pH of the emulsion blend. Thus, pH adjustments may be made, based on the known chemistry of the aldehyde scavenger used. For example, urea is known to be less reactive with formaldehyde at alkalinity levels above a pH of 7, so it would be preferred to adjust the pH of the emulsion blend to a pH ranging from 6 to 2. Similarly, pH adjustments may be necessitated by the known chemistry of the particular (alk)acrylamide-based polymer used in the microemulsion or second emulsion. Any such pH adjustments may be made based on knowledge in the art and with routine experimentation, if necessary.

When the second emulsion is a microemulsion it can be prepared according to conventional microemulsion polymerization procedures, such as disclosed above, except that the formulation should be adjusted to obtain a microemulsion comprising polymer-containing aqueous droplets having a volume average droplet diameter that is greater than the volume average diameter of the aqueous droplets in the microemulsion with which it is combined. For example, if one desired to combine a microemulsion comprising droplets having a volume average droplet diameter of 1000 Å with a second emulsion, then the second emulsion may be a microemulsion generally having an average droplet diameter of at least about 1150 Å, preferably at least about 1300 Å, more preferably at least about 2000 Å and most preferably at least about 3000 Å. Using common knowledge of those skilled in the art, along with simple experimentation, one can modify the microemulsion polymerization to obtain slightly larger aqueous droplets.

Alternatively, the second emulsion may be a conventional water-in-oil macroemulsion, in which case, it is prepared by conventional macroemulsion polymerization methods known in the art, such as, for example, that disclosed in U.S. Pat. No. 3,284,393 to Vanderhoff et al, the disclosure of which is incorporated herein by reference. Any known polymerizable water-soluble ethylenic unsaturated monomer, including those specifically described above, which produce water-swellable or water-soluble polymers that are insoluble in the continuous oil phase, and can be polymerized, may be used to prepare the inverse macroemulsions used in the process of the present invention. The water-soluble monomers and monomer mixtures are polymerized to low or high molecular weight polymers or copolymers using a water-in-oil emulsion polymerization procedure in which the water-soluble monomers are emulsified in an oil phase by means of a water-in-oil emulsifier and subject to polymerization conditions to form the inverse macroemulsion which is used in the process of the instant invention. The monomer content in the aqueous solution can vary anywhere between about 5 and 100% by weight monomer, though this may vary depending on the monomer and temperature of polymerization. Thus, the discontinuous phase or droplets are usually aqueous but may consist of 100% polymer, and 0% water and are prepared using methods known in the art. The term "aqueous droplets" as used for describing macroemulsions herein includes droplets containing amounts of 100% polymer.

The ratio of aqueous phase, which is defined as the monomers or polymer and water, to oil phase widely varies between about 0.1:1 to about 4:1, preferably, between about 1:1 to 4:1. The oil phase includes the hydrocarbon liquid and the surfactant dissolved or dispersed therein.

An emulsifying agent of the water-in-oil type is used in amounts ranging from about 1 to about 6% by weight of the aqueous phase, in order to emulsify the monomer-containing aqueous phase into the oil phase. A wide variety of conventional water-in-oil emulsifying agents which are typically used to prepare macroemulsions may be used, such hexadecyl sodium phthalate, sorbitan monoleate, sorbitan monostearate, cetyl or stearyl sodium phthalate, metal soaps, and the like. Upon performing relatively simple tests one skilled in the art would be able to determine whether a specific water-in-oil emulsifying agent or emulsifier mixture would be adequate for a particular system.

The oil phase can be any inert hydrophobic liquid such as, for example, hydrocarbons, perchloroethylene, aryl hydrocarbons, such as toluene and xylene. Preferably paraffin solvents are used.

Polymerization of the macroemulsion may be carried out pursuant to those methods known in the art, including high energy irradiation such as gamma irradiation $CO^{60}$, ultraviolet irradiation or the like. Free radical initiators may also be used, such as potassium persulfate, as well as azo compounds, peroxides and redox pairs or the like. Certain polymerization methods may preferably be carried out at elevated temperatures.

Preferably, the emulsifying agent is dissolved in the oil phase and the monomer-containing aqueous phase is added to the oil phase with agitation until the aqueous phase is emulsified in the oil phase. Additional conventional additives such as chelating agents, small amounts of chain transfer agents and difunctional monomers such as methylene (bis)acrylamide, may also be dissolved in the aqueous phase or mixed into the inverse emulsion. Polymerization agents, such as free radical initiators, may be dissolved in the oil or aqueous phase or the emulsion. Polymerization is conducted preferably with agitation, until conversion is substantially complete. The resulting polymeric macroemulsion may be subsequently stabilized or treated according to any methods known in the art.

While the preferred embodiment of this invention contemplates blending one polymeric microemulsion with one second emulsion, which is preferably a macroemulsion, the instant claimed invention may be applied to the blending of more than two emulsions, such as blending two or more microemulsions with one macroemulsion or blending one microemulsion with two or more macroemulsions. In cases where two or more microemulsions are combined with a second emulsion, the volume average aqueous droplet diameter in the second emulsion must be greater than, generally at least about 150 Å greater, preferably at least about 300 Å greater, more preferably at least about 1000 Å greater and most preferably at least about 2000 Å greater than the smallest volume average aqueous droplet diameter among the microemulsions. In cases where two or more second emulsions are combined with one microemulsion, the second emulsion having the largest volume average droplet diameter must be greater than, generally at least about 150 Å greater, preferably at least about 300 Å greater, more preferably at least about 1000 Å greater and most preferably at least about 2000 Å greater than the volume average droplet diameter of the droplets in the microemulsion. A variety of polymer combinations may be incorporated in the foregoing.

The mulltimodal emulsions produced by the present invention are useful in facilitating a wide variety of solid-liquid separation operations such as flocculation for waste water treatment or for paper manufacture processes, the clarification of deinking process waters and the like. The polymeric multimodal emulsions may be used in the dewatering of biologically treated suspensions, such as sewage and other municipal or industrial sludges, the drainage of cellulosic suspensions such as those found in paper production, in the treatment of paper waste, and settlement of various suspensions, i.e., refinery waste, food waste, etc. The stable emulsions of the present invention may also be used as retention aids, wet strength or dry strength agents in the manufacture of paper, for protein recovery and as mining waste treating and settling aids.

With respect to flocculation applications, the multimodal emulsions may be employed in its emulsion form or in the form of a dilute aqueous polymer-containing solutions prepared by inverting the emulsion into water, optionally in the presence of a breaker surfactant. When breaker surfactant is added, it should be in an amount sufficient to enable the inverted polymer or polymer combination to reach its maximum solution viscosity. Optionally, the breaker surfactant may be added to the microemulsion or the second emulsion or both before mixing the two.

In addition to inverting the multimodal emulsions of the present invention, the polymers in the multimodal emulsion blends may be recovered from the emulsion by conventional means, such as by stripping or by adding the emulsion blend to a solvent which precipitates the polymer, e.g., isopropanol or acetone, filtering off the resultant solids, drying and redispersing in water to form a dilute aqueous solution containing polymer. Dilute aqueous solutions include solutions containing water-swellable as well as water-soluble polymers. The emulsion blends of the present invention may also be stripped to increase the percentage of polymer solids.

Since the stabilized compositions produced herein can contain two different polymers, they can be used to provide both a cationic and an anionic polymer or a high molecular weight polymer and a low molecular weight polymer substantially simultaneously for facilitating the separation of suspended solids from aqueous dispersions containing suspended solids. The advantage of this is that a single handling apparatus and single dosage point may be employed to use two different polymers.

An alternative method of practicing the present invention is to blend, substantially simultaneously into the aqueous medium to be treated, flocculating amounts of the one or more microemulsions with the secondary emulsion(s). For example, if one desired to use a multimodal emulsion for flocculating municipal sludge, one could add the microemulsion(s) and second emulsion(s) substantially simultaneously into the sludge dispersion to be treated and mix the two or more emulsions within the dispersion. This may be less preferred.

Flocculating amount is the amount of emulsion or dilute aqueous solution for sufficiently flocculating suspended solids in an aqueous dispersion. That amount will depend upon the particular application and the severity of the problem addressed. For the flocculation of paper sludge or municipal sludge, for example, it is preferable to use an amount of emulsion or dilute aqueous solution capable of providing anywhere from about 0.02 to about 200 pounds total polymer per ton of dry sludge, more preferably from about 1 to about 100 pounds total polymer per ton of dry sludge. The appropriate dosage for each application may be easily ascertained by simple experimentation or from knowledge in the art.

It is believed that one skilled in the art can use the preceding description to utilize the present invention to its fullest extent.

DESCRIPTION OF THE PREFERRED EMBODIMENTS

The following examples are set forth for illustration purposes only and are not to be construed as limitations on the present invention, as set forth in the appended claims.

Standard Viscosity (SV) is measured by adding 8 grams of a 0.2% aqueous polymer solution to 8.6 grams of a 2N NaCl aqueous solution, stirring the resulting mixture for 5 minutes to dissolve the salt, adjusting the pH to 5, for cationic polymers and pH 8 for anionic polymers and determining the viscosity at 25° C. with a Brookfield viscometer (LVT model) with UL adapter at 60 rpm.

Examples 1–12 illustrate the preparation of a variety of polymeric compositions in an inverse microemulsion formulation.

Example 1

Preparation of Poly(acrylamide) Inverse Microemulsion

To 2236 g of an organic solution containing 1820 g of low odor paraffin oil, 290 g of Polyoxyethylene sorbitol fatty acid ester and 126 g of Sorbitan sesquioleate is slowly added 2208.9 g of a pH=3 aqueous solution containing 1000 g acrylamide (AMD) 60 g of acetic acid, 2 g of isopropanol, 20.1 g of ethylenediaminetetraacetic acid tetra sodium salt, 1.5 g of sodium bromate, 1.4 g of sulfuric acid and 1123.9 g of water. The resulting monomer emulsion is sparged for 60 minutes with nitrogen. $SO_2$ gas is then bubbled through the emulsion at a rate maintaining the rate of temperature increase around 2° C./min. allowing a maximum batch temperature of 65° C. Once the AMD conversion is greater than 99% the batch is cooled to 30° C. The result is a clear, stable PAM microemulsion having a SV between 3.0 and 4.0 cps.

Example 2

Preparation of N,N-Dimethylaminomethanol (DMAM-S)

Paraformaldehyde 450 g (92%, 414 g real) is slowly added to an aqueous dimethylamine solution containing 640 g of real dimethylamine and 427 g water while maintaining the temperature below 30° C. until the solids dissolve. Dicyanamide 60 g and 70 g of sodium metabisulfite and 378 g of $H_2O$ are added maintaining the temperature below 35° C. affording DMAM-S.

Example 3

Preparation of PAM-Mannich -75 Inverse Microemulsion 4425.4 g of PAM microemulsion of Example 1 is placed in a reaction vessel at ambient temperature. To this are slowly added 885.0 g of low odor paraffin oil followed by 2025 g of DMAM-S of Example 2, the DMAM-S being added over a 1.5 hour period maintaining the temperature between 30–35° C. The resulting PAM-Mannich microemulsion is stirred at this temperature for an additional 16 hours. The resulting PAM-Mannich, 7335.4 g is obtained as an opaque microemulsion.

Example 4

Quaternization of PAM-Mannich Microemulsion of Example #3

7025.4 g of PAM-Mannich of Example 3 is placed in a stirred pressure reactor and the temperature adjusted to 25° C. To this is added 839 g of methyl chloride at a rate sufficient to maintain the temperature below 32° C. and the reactor pressure below 30 psi. The resulting microemulsion is stirred at this temperature for an additional 18 hours. After this time, the pH of the emulsion is between 5 and 6 and the excess methyl chloride removed. To the resulting microemulsion is added 140 g of a 23% sodium metabisulfite solution followed by 253 g of ethoxylated nonylphenol. The resulting product is a clear, stable quaternized Mannich PAM microemulsion having an average of 75±5% cationic charge as measured by infrared spectroscopy.

Example 5

Heat Treatment of Microemulsion of Example 4

8519.6 g of the Quaternized PAM-Mannich Microemulsion of Example 4 is placed in a reaction vessel at ambient temperature. To this is slowly added with stirring 453.4 g of low odor paraffin oil and 668.9 g of buffer solution, which consists of 66.2 g of urea, 111.6 g of 88.5% lactic acid and 491.1 g of water. The resulting mixture is heated to 67° C. and maintained for 9 hours with agitation. The resulting product is an opaque microemulsion.

Example 6

Preparation of PAM-Mannich-55 Inverse Microemulsion 4425.4 g of PAM microemulsion of Example 1 is placed in a reaction vessel at ambient temperature. To this are slowly added 885.0 g of low odor paraffin oil followed by 1420.0 g of DMAM-S of Example 2, the DMAM-S being added over a 1.5 hour period maintaining the temperature between 30–35° C. The resulting PAM-Mannich microemulsion is stirred at this temperature for an additional 16 hours. The resulting PAM-Mannich, 6730.4 g is an opaque microemulsion.

Example 7

Quaternization of PAM-Mannich Microemulsion of Example 6

6700.0 g of PAM-Mannich of Example 6 is placed in a stirred pressure reactor and the temperature adjusted to 25° C. To this is added 645.9 g of methyl chloride at a rate maintaining the temperature below 32° C. and the reactor pressure below 30 psi. The resulting microemulsion is stirred at this temperature for an additional 18 hours. After this time, the pH of the emulsion is between 5 and 6 and the excess methyl chloride removed. To the resulting microemulsion is added 215.9 g of ethoxylated nonylphenol. The resulting product is a clear, stable quaternized Mannich PAM microemulsion having an average of 55±5% cationic charge as measured by infrared spectroscopy.

Example 8

Heat Treatment of Quaternized PAM-Mannich Microemulsion of 7197.0 g of the Quaternized PAM-Mannich Microemulsion of Example 7 is placed in a reaction vessel at ambient temperature. To this is slowly added with stirring 453.4 g of low odor paraffin oil and 2032.6 g of buffer solution, which consists of 70.6 g of urea, 93.5 g of 88.5% lactic acid and 1868.5 g of water. The resulting mixture is heated to 67° C. and maintained for 9 hours with agitation. The resulting product is an opaque microemulsion.

Example 9

Preparation of Ammonium Acrylate/Acrylamide Copolymer Microemulsion

An organic solution is prepared by combining a low odor paraffin oil (252.0 g), sorbitan sesquioleate (8.5 g) and polyoxyethylene sorbitol fatty acid (39.5 g) in a reactor with stirring. To this solution is added an aqueous solution of pH=8.0 containing acrylamide (84.0 g), acrylic acid (36.0 g) neutralized with aqueous ammonium hydroxide (35.7 g), tert-butyl hydroperoxide (0.048 g), ethylenediaminetetraacetic acid tetra sodium salt (0.24 g), and water (144.0 g).

The reactor is sealed and sparged with nitrogen for 30 minutes. Sulfur dioxide gas is then bubbled in to the emulsion at rate so as to maintain a temperature rise of around 2.0° C./min. The sulfur dioxide flow rate is maintained until the combined acrylic acid/acrylamide conversion is greater than 99%.

Example 10

Preparation of 2-Acrylamido-2-Methyl-1-Propanesulfonic Acid Sodium Salt/Acrylamide Copolymer Microemulsion An organic solution is prepared by combining a low odor paraffin oil (252.0 g), sorbitan sesquioleate (6.0 g) and polyoxyethylene sorbitol fatty acid (42.0 g) in a reactor with stirring. To this solution is added an aqueous solution containing acrylamide (50.8 g), 2-acrylamido-2-methyl-1-propanesulfonic acid sodium salt (69.2 g), tert-butyl hydroperoxide (0.048 g), ethylenediaminetetraacetic acid tetra sodium salt (0.24 g), and water (179.7

The reactor is sealed and sparged with nitrogen for 30 minutes. Sulfur dioxide gas is then bubbled in to the emulsion at rate so as to maintain a temperature rise of around 2.0° C./min. The sulfur dioxide flow rate is maintained until the combined acrylamido-2-methyl-1-propanesulfonic acid sodium salt/acrylamide conversion is greater than 99%.

Example 11

Preparation of Acryloyloxyethyltrimethylammonium—Chloride/Acrylamide Copolymer Microemulsion An organic solution is prepared by combining a low odor paraffin oil (208.4 g), polyoxyethylene sorbitan monooleate (9.0 g) and polyoxyethylene sorbitan trioleate (32.6 g) in a reactor with stirring. To this solution is added an aqueous solution, adjusted to pH=3.5 with sulfuric acid, containing acrylamide (24.0 g), acryloxyethyltrimethyl ammonium chloride (80.2 g), sodium bromate (0.01 g), ethylenediaminetetraacetic acid tetra sodium salt (0.21 g), and water (145.58 g).

The reactor is sealed and sparged with nitrogen for 30 minutes. Sulfur dioxide gas is then bubbled into the emulsion at rate so as to maintain a temperature rise of around 2.0 C./min. The sulfur dioxide flow rate is maintained until the combined 2-acrylamido-2-methyl-1-propanesulfonic acid sodium salt/acrylamide conversion is greater than 99%.

Example 12

Preparation of Diallyldimethylammonium Chloride/Acrylamide Copolymer Microemulsion An organic solution is prepared by combining a low odor paraffin oil (240.0 g), polyoxyethylene sorbitan monooleate (10.0 g) and polyoxyethylene sorbitol fatty acid (50.0 g) in a reactor with stirring. To this solution is added an aqueous solution of pH=2.9 containing acrylamide (33.8 g), diallyldimethylammonium chloride (50.7 g), N-(2-hydroxyethyl)ethylenediaminetriacetic acid (0.25 g), ammonium persulfate (0.0032 g) and water (115.9 g).

The reactor is sealed and sparged with nitrogen for 30 minutes. A solution of ferrous ammonium sulfate hexahydrate (0.45 wt % in water) is added at a rate so as to maintain a reaction temperature of 30–35° C. The ferrous ammonium sulfate hexahydrate flow rate is maintained for 20 hours.

Examples 13–25 illustrate the preparation of a variety of polymeric compositions in an inverse macroemulsion formulation.

Examples 13–15

Preparation of Acrylamide/Acryloxyethytrimethyl Ammonium Chloride Inverse Emulsion Polymers General polymerization procedure. AMD, acryloxyethyltrimethylammonium chloride, ammonium sulfate, glutaric acid solution, ethylenediaminetetraacetic acid tetra sodium salt solution, isopropanol, tert-butyl hydroperoxide solution, and DI water are combined and the pH adjusted to 3.5 with sulfuric acid. Sorbitan monooleate is combined with low odor paraffin oil. The aqueous solution is slowly added to the oil solution and the combined mixture homogenized until a viscosity of 1200–1500 cps is obtained. The emulsion is sparged with nitrogen. The emulsion is heated to 40° C. The metabisulfite (MBS) solution is added at a rate to keep the reaction temperature between 40–45° C. This is maintained until the reaction conversion is at least 99%.

TABLE 1

| Components | Ex. 13 20% Charge | Ex. 14 40% Charge | Ex. 15 55% Charge |
| --- | --- | --- | --- |
| Oil Phase | | | |
| Oil | 176.50 g | 176.50 g | 173.40 g |
| Sorbitan monooleate | 17.90 g | 17.90 g | 21.00 g |
| Agueous Phase | | | |
| AMD (50% soln.) | 249.82 g | 179.02 g | 138.8 g |
| Acryloxyethyltrimethyl ammonium chloride (80% soln.) | 106.20 g | 169.04 g | 289.50 g |
| Ammonium sulfate | 4.10 g | 4.10 g | 4.10 g |
| Glutaric acid (50% soln.) | 29.40 g | 29.40 g | 36.12 g |
| ethylenediaminetetra acetic acid tetra sodium salt (5% soln.) | 3.92 g | 4.90 g | 6.00 g |
| Isopropanol | 4.20 g | 3.15 g | 0.75 g |
| tert-butyl hydroperoxide | 0.50 g | 0.50 g | 3.20 g |
| De-ionized water | 92.46 g | 100.49 g | 12.11 g |

Examples 16–18

Preparation of Acrylamide/Acryloxyethyltrimethyl Ammonium Chloride Inverse Emulsion Polymers General polymerization procedure. The aqueous phase components listed below are combined and the pH adjusted to 3.5 with sulfuric acid. The sorbitan monooleate is combined with low odor paraffin oil. The aqueous phase is slowly added to the oil phase and the combined mixture homogenized until a viscosity of 1200–1500 cps is obtained. The emulsion is sparged with nitrogen and heated to 40° C. 15 mL of a 0.8 wt % sodium metabisulfite solution in deionized (DI) H$_2$O is prepared and sparged with nitrogen. The sodium metabisulfite is added to the polymerization mixture at a rate sufficient to maintain the temperature of the mixture between 40–45° C. This is maintained until the reaction conversion is at least 99%. At the completion of the polymerization 10.0 g of a 30% wt. % solution of sodium metabisulfite in DI H$_2$O is added to the emulsions containing polymer having 1 and 5% charge over 15 minutes.

TABLE 2

| Components | Ex. 16 1% Charge | Ex. 17 5% Charge | Ex. 18 10% Charge |
|---|---|---|---|
| Oil Phase | | | |
| Oil | 176.50 g | 176.50 g | 176.50 g |
| Sorbitan monooleate | 17.90 g | 17.90 g | 17.90 g |
| Agueous Phase | | | |
| AMD (50% soln.) | 354.25 g | 371.28 g | 354.00 g |
| Acryloxyethyltrimethyl ammonium chloride (80% soln.) | 6.10 g | 33.33 g | 67.13 g |
| Ammonium sulfate | 0.00 g | 0.00 g | 4.10 g |
| Glutaric acid (50% soln.) | 25.47 g | 25.47 g | 27.70 g |
| ethylenediaminetetra acetic acid tetra sodium salt (5% soln.) | 4.25 g | 4.25 g | 0.00 g |
| Pentasodium diethylenetriamine pentaacetic acid (40% soln.) | 0.00 g | 0.00 g | 0.58 g |
| Isopropanol | 1.83 g | 2.12 g | 2.31 g |
| NaBrO$_3$ (2% soln.) | 0.00 g | 1.00 g | 2.10 g |
| tert-butyl hydroperoxide (2% soln.) | 1.00 g | 0.00 g | 0.00 g |
| De-ionized water | 86.78 g | 43.46 g | 32.68 g |

Example 19

Preparation of 2-Acryloyloxyethyltrimethylammonium Chloride/Acrylamide Copolymer (45/55 mole %) Inverse Emulsion Polymerization Procedure The oil phase and aqueous phase enumerated below are prepared separately. Thereafter they are combined and homogenized to yield a monomer emulsion. The monomer emulsion is purged with nitrogen and SO$_2$ is bubbled through the emulsion at a rate sufficient to bring the emulsion temperature up to and maintained at 40° C. This is continued until the polymerization is complete. The emulsion is cooled to room temperature and Ethoxylated alcohol—60% EO is added with stirring.

| Oil Phase: | |
|---|---|
| Low odor paraffin oil | 177.20 g |
| Sorbitain monooleate | 8.10 g |
| Ethoxylated alcohol - 60% EO | 12.69 g |
| Total Oil Phase: | 197.99 g |
| Aqueous Phase: | |
| Acrylamide (52.77%) | 144.07 g |
| Acryloyloxyethyltrimethyl ammonium Chloride (80%) | 315.41 g |
| Pentasodium diethylenetriamine pentaacetic acid (40%) | 0.82 g |
| 2-Propanol | 1.12 g |
| Citric acid | 19.68 g |
| DI Water | 110.09 g |
| Sodium bromate (2.51%) | 0.65 g |
| Aqueous Ammonia (29%) | 2.16 g |
| Total Aqueous Phase (at pH 3.5): | 594.00 g |
| Total Monomer Emulsion: | 792.00 g |
| Ethoxylated alcohol - 60% EO | 8.00 g |
| Total Product Emulsion: | 800.00 g |

Example 20

Preparation of Structured 2-Acryloxyethyltrimethylammonium Chloride/Acrylamide Copolymer (45/55 mole %) Inverse Emulsion Polymerization Procedure The oil phase and aqueous phase enumerated below are prepared separately. Thereafter they are combined and homogenized to yield a monomer emulsion. The monomer emulsion is purged with nitrogen and SO$_2$ is bubbled through the emulsion at a rate sufficient to bring the emulsion temperature up to and maintained at 40° C. This is continued until the polymerization is complete. The emulsion is cooled to room temperature and Malic acid and Ethoxylated alcohol—60% EO are then added with stirring.

| Oil Phase: | |
|---|---|
| Low odor paraffin oil | 11939 g |
| N,N-bis-(2-hydroxyethyl)oleamide | 524 g |
| Ethoxylated alcohol - 60% EO | 402 g |
| Total Oil Phase: | 12865 g |
| Aqueous Phase: | |
| Acrylamide (50%) | 8844 g |
| Acryloxyethyltrimethyl ammonium Chloride (80%) | 18430 g |
| Ammonium sulfate | 250 g |
| Sulfuric acid (10%) | 230 g |
| Disodium EDTA dihydrate | 19 g |
| 2-Propanol | 245 g |
| Methylene bis(acrylamide) | 0.406 g |
| DI Water | 4021 g |
| t-butyl hydroperoxide (70%) | 0.478 g |
| Total Aqueous Phase (at pH 3.5): | 32039 g |
| Total Monomer Emulsion: | 44904 g |
| Malic acid (50%) | 2300 g |
| Ethoxylated alcohol - 60% EO | 209 g |
| Total Product Emulsion: | 47413 g |

Example 21

Preparation of Acryloxyethyltrimethylammonium Chloride/Acrylamide Copolymer (10/90 mole %) Inverse Emulsion Containing Urea Polymerization Procedure The oil phase and aqueous phase enumerated below are prepared separately. Thereafter they are combined and homogenized to yield a monomer emulsion. The monomer emulsion is purged with nitrogen and SO$_2$ is bubbled through the emulsion at a rate sufficient to bring the emulsion temperature up to and maintained at 40° C. This is continued until the polymerization is complete. The emulsion is cooled to room temperature and Malic acid and Ethoxylated alcohol—60% EO are then added with stirring.

| Oil Phase: | |
|---|---:|
| Low odor paraffin oil | 175.06 g |
| Sorbitain monooleate | 16.54 g |
| Ethoxylated alcohol - 60% EO | 4.00 g |
| Total Oil Phase: | 195.60 g |
| Aqueous Phase: | |
| Acrylamide (52.33%) | 387.14 g |
| Acryloyloxyethyltrimethyl ammonium Chloride (80%) | 76.76 g |
| Pentasodium diethylenetriamine pentaacetic acid (40%) | 1.32 g |
| 2-Propanol | 3.43 g |
| DI Water | 13.38 g |
| Urea | 65.20 g |
| Sodium bromate (2.51%) | 1.05 g |
| Sulfuric acid (conc.) | 0.52 g |
| Total Aqueous Phase (at pH 3.5): | 518.00 g |
| Total Monomer Emulsion: | 713.60 g |
| Malic acid (50%) | 68.80 g |
| Ethoxylated alcohol - 60% EO | 17.60 g |
| Total Product Emulsion: | 832.80 g |

Example 22

Preparation of Diallyldimethylammonium Chloride Inverse Emulsion

Polymerization Procedure

The oil phase and aqueous phase are prepared separately. Thereafter they are combined and homogenized to yield a monomer emulsion. 1.28 g of 2,2'-azobis(2,4-dimethylvaleronitrile) (Vazo-52) in 10 mL of toluene are added and the monomer emulsion is purged with nitrogen. The emulsion is heated and maintained at 60° C. for 7 hours after which time the resulting emulsion is cooled to room temperature.

| Oil Phase: | |
|---|---:|
| Low odor paraffin oil | 177.21 g |
| Sorbitain monooleate | 8.10 g |
| Ethoxylated alcohol - 60% EO | 12.69 g |
| Total Oil Phase: | 198.00 g |
| Aqueous Phase: | |
| Diallyldimethylammonium chloride (60%) | 533.33 g |
| Pentasodium diethylenetriamine pentaacetic acid (40%) | 1.60 g |
| DI Water | 59.07 g |
| Total Aqueous Phase: | 594.00 g |
| Total Monomer Emulsion: | 792.00 g |

Example 23

Preparation of Ammonium Acrylate/Acrylamide Copolymer (30/70 mole %) Inverse Emulsion Polymerization Procedure The oil phase and aqueous phase enumerated below are prepared separately. Thereafter they are combined and homogenized to yield a monomer emulsion. The monomer emulsion is purged with nitrogen and $SO_2$ is bubbled through the emulsion at a rate sufficient to bring the emulsion temperature up to and maintained at 40° C. This is continued until the polymerization is complete. The emulsion is cooled to room temperature and the sodium metabisulfite solution and Ethoxylated alcohol—60% EO are added with stirring.

| Oil Phase: | |
|---|---:|
| Low odor paraffin oil | 162.57 g |
| Sorbitain monooleate | 14.64 g |
| Ethoxylated alcohol - 60% EO | 5.68 g |
| Total Oil Phase: | 182.89 g |
| Aqueous Phase: | |
| Acrylamide (52.77%) | 348.72 g |
| Acrylic acid (glacial) | 79.98 g |
| Lactic acid (85%) | 0.62 g |
| Pentasodium diethylenetriamine pentaacetic acid (40%) | 0.53 g |
| t-butyl hydroperoxide (3.01%) | 0.54 g |
| Aqueous Ammonia (29%) | 66.30 g |
| DI Water | 89.12 g |
| Total Aqueous Phase (at pH 7.5): | 585.81 g |
| Total Monomer Emulsion: | 768.70 g |
| Sodium metabisulfite (30%) | 17.12 g |
| Ethoxylated alcohol - 60% EO | 14.00 g |
| Total Product Emulsion: | 799.82 g |

Example 24

Preparation of Ammonium Acrylate/Acrylamide Copolymer (30/70 mole %) Inverse Emulsion Polymerization Procedure The oil and surfactants are combined. In a separate vessel the acrylamide and glacial acrylic acid are combined and cooled with an ice bath to approximately 10° C. The aqueous ammonia is added slowly to pH 7.0, while maintaining the monomer solution temperature below 35° C. with the use of the ice bath. The lactic acid, ethylenediaminetetraacetic acid disodium salt solution and deionized water are added to the monomer solution. The aqueous phase is slowly added to the oil phase and homogenized until a viscosity of 1200–2000 cps is achieved. The emulsion is placed in a water bath at 40° C. and the t-butyl hydroperoxide solution is added. The emulsion is purged with nitrogen for 15 minutes. 20 mL of a solution of sodium metabisulfite (MBS), 0.2% in deionized water is prepared and purged with nitrogen. The MBS solution is added at a rate sufficient to increase the reaction temperature to 50° C. within 30–50 minutes. The remainder of the MBS solution is added at a rate to maintain 50° C. until the polymerization is complete. The reaction is allowed to cool to room temperature and the aqueous ammonia, sodium metabisulfite and Ethoxylated alcohol—60% EO are added sequentially, each over a 30 minute period with stirring.

| Oil Phase: | |
|---|---:|
| Low odor paraffin oil | 145.09 g |
| N,N-bis-(2-hydroxyethyl)oleamide | 12.60 g |
| Ethoxylated alcohol - 60% EO | 1.40 g |

-continued

| | |
|---|---|
| Total Oil Phase: | 159.09 g |
| Aqueous Phase: | |
| Acrylamide (50.0%) | 334.18 g |
| Acrylic acid (glacial) | 72.62 g |
| Lactic acid (85%) | 0.56 g |
| ethylenediamine tetraacetic acid disodium salt (10% soln.) | 7.42 g |
| Aqueous Ammonia (29% soln.) | 67.20 g |
| t-butyl hydroperoxide (1.48%) | 1.00 g |
| DI Water | 57.93 g |
| Total Aqueous Phase (at pH 7.5): | 540.91 g |
| Total Monomer Emulsion: | 700.00 g |
| Aqueous Ammonia (30%) | 5.60 g |
| Sodium metabisulfite (30%) | 17.12 g |
| Ethoxylated alcohol - 60% EO | 14.00 g |
| Total Product Emulsion: | 736.72 g |

Example 25

Preparation of 2-Acrylamido2-Methyl-1-Propanesulfonic Acid Sodium Salt/Acrylamide Copolymer Inverse Emulsion Polymerization Procedure The oil phase and aqueous phase enumerated below are prepared separately. Thereafter they are combined and homogenized to yield a monomer emulsion. The monomer emulsion is purged with nitrogen and $SO_2$ is bubbled through the emulsion at a rate sufficient to bring the emulsion temperature up to and maintained at 40° C. This is continued until the polymerization is complete. The emulsion is cooled to room temperature and Ethoxylated alcohol—60% EO is added with stirring.

| | |
|---|---|
| Oil Phase: | |
| Low odor paraffin oil | 175.87 g |
| Sorbitain monooleate | 14.74 g |
| Ethoxylated alcohol - 60% EO | 5.89 g |
| Total Oil Phase: | 196.50 g |
| Aqueous Phase: | |
| Acrylamide (52.89%) | 249.57 g |
| 2-Acrylamido-2-Methyl-1-Propanesulfonic Acid Sodium Salt (50%) | 264.00 g |
| 2-Propanol | 0.26 g |
| Pentasodium diethylenetriamine pentaacetic acid (40%) | 1.32 g |
| t-butyl hydroperoxide (3.01%) | 1.32 g |
| Sulfuric acid (conc.) | 0.13 g |
| DI Water | 72.90 g |
| Total Aqueous Phase (at pH 7.0–7.2): | 589.50 g |
| Total Monomer Emulsion: | 786.00 g |
| Ethoxylated alcohol - 60% EO | 14.00 g |
| Total Product Emulsion: | 800.00 g |

Examples 26–52 and 53–72 illustrate the preparation of a variety of multimodal emulsion blends arrived at by mixing a microemulsion and a macroemulsion. The data in Table 3 shows various emulsion blends made from a macroemulsion having a cationic functionality of 10 mole percent, based on monomer, and a polymeric microemulsion having a cationic functionality of 75 mole percent, based on monomer. The data for Examples 53–72 in Table 4 shows that a desired overall charge may be obtained by blending polymeric microemulsions and macroemulsions having a variety of different charges. The data in Tables 3 and 4 shows that one can, by using the process of the instant invention and varying the proportions of microemulsion and macroemulsion having certain percentage cationic functionality, easily obtain a stable emulsion blend having a desired charge. Moreover, by varying the standard viscosity of the microemulsions and macroemulsions that are blended, one can easily obtain a multimodal blend having a desired standard viscosity. A flexible process for obtaining polymeric emulsions having a desired overall charge and standard viscosity is valuable because polymer flocculation performance is known to be affected by polymer charge and standard viscosity.

Example 26–52

Preparation of Blends

General procedure

Polymers

The microemulsions are prepared according to Examples 1–5. The different polymer SVs are achieved by varying the amount of isopropanol used to prepare the PAM microemulsion of Example 1. The macroemulsions are prepared according to Example 18. The different polymer SVs are prepared by varying the amount of isopropanol added to the emulsion polymerization. The SV of the blend is as expected from a weighed average of the component polymers.

Blend Preparation

The appropriate amount of the inverse macro-emulsion is weighed into a beaker. The appropriate amount of a 50 wt. % aqueous solution of stabilizer is added to the emulsion over a period of 5 minutes with stirring. The inverse micro-emulsion is then added over 5 minutes and the resulting blend is stirred for 30 minutes.

TABLE 3

| Blend Example | Blend Charge | Urea[1] Content (wt. %) | Blend SV[2] (cps) | Macro emulsion Charge[3] | Macro emulsion SV (cps) | Macro emulsion wt. (g) | Urea 50% soln.(g) | Micro emulsion Charge | Micro emulsion SV (ops) | Micro emulsion wt.(g) |
|---|---|---|---|---|---|---|---|---|---|---|
| 26 | 55 | 1.5 | 2.9 | 10 | 4.0 | 18.2 | 3.1 | 75 | 2.9 | 81.8 |
| 27 | 55 | 1.5 | 2.8 | 10 | 4.0 | 18.2 | 3.1 | 75 | 2.5 | 81.8 |
| 28 | 55 | 1.5 | 2.6 | 10 | 4.0 | 18.2 | 3.1 | 75 | 2.3 | 81.8 |

TABLE 3-continued

| Blend Example | Blend Charge | Urea[1] Content (wt. %) | Blend SV[2] (cps) | Macro emulsion Charge[3] | Macro emulsion SV (cps) | Macro emulsion wt. (g) | Urea 50% soln.(g) | Micro emulsion Charge | Micro emulsion SV (ops) | Micro emulsion wt.(g) |
|---|---|---|---|---|---|---|---|---|---|---|
| 29 | 55 | 1.5 | 2.7 | 10 | 2.8 | 18.2 | 3.1 | 75 | 2.9 | 81.8 |
| 30 | 55 | 1.5 | 2.6 | 10 | 2.8 | 18.2 | 3.1 | 75 | 2.5 | 81.8 |
| 31 | 55 | 1.5 | 2.5 | 10 | 2.8 | 18.2 | 3.1 | 75 | 2.3 | 81.8 |
| 32 | 55 | 1.5 | 2.6 | 10 | 2.2 | 18.2 | 3.1 | 75 | 2.9 | 81.8 |
| 33 | 55 | 1.5 | 2.4 | 10 | 2.2 | 18.2 | 3.1 | 75 | 2.5 | 81.8 |
| 34 | 55 | 1.5 | 2.3 | 10 | 2.2 | 18.2 | 3.1 | 75 | 2.3 | 81.8 |
| 35 | 35 | 2.0 | 3.1 | 10 | 4.0 | 14.0 | 1.43 | 75 | 2.9 | 20.3 |
| 36 | 35 | 2.0 | 3.1 | 10 | 4.0 | 14.0 | 1.43 | 75 | 2.5 | 20.3 |
| 37 | 35 | 2.0 | 3.0 | 10 | 4.0 | 14.0 | 1.43 | 75 | 2.3 | 20.3 |
| 38 | 35 | 2.0 | 2.8 | 10 | 2.8 | 14.0 | 1.43 | 75 | 2.9 | 20.3 |
| 39 | 35 | 2.0 | 2.7 | 10 | 2.8 | 14.0 | 1.43 | 75 | 2.5 | 20.3 |
| 40 | 35 | 2.0 | 2.7 | 10 | 2.8 | 14.0 | 1.43 | 75 | 2.3 | 20.3 |
| 41 | 35 | 2.0 | 2.4 | 10 | 2.2 | 14.0 | 1.43 | 75 | 2.9 | 20.3 |
| 42 | 35 | 2.0 | 2.3 | 10 | 2.2 | 14.0 | 1.43 | 75 | 2.5 | 20.3 |
| 43 | 35 | 2.0 | 2.3 | 10 | 2.2 | 14.0 | 1.43 | 75 | 2.3 | 20.3 |
| 44 | 20 | 1.5 | 3.0 | 10 | 4.0 | 26.6 | 3.1 | 75 | 2.9 | 73.4 |
| 45 | 20 | 1.5 | 2.8 | 10 | 4.0 | 26.6 | 3.1 | 75 | 2.5 | 73.4 |
| 46 | 20 | 1.5 | 2.6 | 10 | 4.0 | 26.6 | 3.1 | 75 | 2.3 | 73.4 |
| 47 | 20 | 1.5 | 2.8 | 10 | 2.8 | 26.6 | 3.1 | 75 | 2.9 | 73.4 |
| 48 | 20 | 1.5 | 2.7 | 10 | 2.8 | 26.6 | 3.1 | 75 | 2.5 | 73.4 |
| 49 | 20 | 1.5 | 2.5 | 10 | 2.8 | 26.6 | 3.1 | 75 | 2.3 | 73.4 |
| 50 | 20 | 1.5 | 2.7 | 10 | 2.2 | 26.6 | 3.1 | 75 | 2.9 | 73.4 |
| 51 | 20 | 1.5 | 2.4 | 10 | 2.2 | 26.6 | 3.1 | 75 | 2.5 | 73.4 |
| 52 | 20 | 1.5 | 2.3 | 10 | 2.2 | 26.6 | 3.1 | 75 | 2.3 | 73.4 |

[1]Urea added to maoroemulsion (wt. % based on emulsion blend)
[2]Standard Viscosity is measured centipoise (cps)
[3]Cationic functionality (mole % based on monomer)

Example 53–72

Preparation of Blends at 55% Charge

These examples demonstrate the versatility of the process of the instant invention for blending a variety of two differently charged emulsions. It is possible to prepare blends having a desired charge from a variety of component polymers. To compensate for the charge on the component polymers, one simply varies the relative amounts of macroemulsion and microemulsion. For the blends below the appropriate amounts of a 50% aqueous urea solution was added dropwise to the macroemulsion with stirring. The microemulsion was then added to the mixture with stirring. The different polymer SVs are achieved by varying the amount of isopropanol use to prepare the microemulsions and macroemulsions. The SV of the blend is as expected from a weighted average of the component polymers.

TABLE 4

| Blend Example | Blend Charge[1] | Urea[2] Content (wt. %) | Blend SV[3] (cps) | Macro Emulsion of Example | Macro emulsion SV (cps) | Macro emulsion weight (g) | Urea 50% soln. (g) | Micro emulsion of Example | Micro emulsion SV (cps) | Micro emulsion weight (g) |
|---|---|---|---|---|---|---|---|---|---|---|
| 53 | 55 | 2.5 | 2.7 | 17 | 3.8 | 2.9 | 1.0 | 5 | 2.5 | 15.9 |
| 54 | 55 | 2.5 | 2.2 | 13 | 2.2 | 4.5 | 1.0 | 5 | 2.9 | 13.9 |
| 55 | 55 | 2.5 | 2.5 | 18 | 2.9 | 3.1 | 1.0 | 5 | 2.9 | 15.3 |
| 56 | 55 | 2.5 | 2.1 | 13 | 2.2 | 4.5 | 1.0 | 5 | 2.0 | 13.9 |
| 57 | 55 | 2.5 | 2.4 | 13 | 2.2 | 4.5 | 1.0 | 5 | 2.5 | 13.9 |
| 58 | 55 | 2.5 | 2.3 | 13 | 2.4 | 4.5 | 1.0 | 5 | 2.0 | 13.9 |
| 59 | 55 | 2.5 | 2.1 | 17 | 2.1 | 2.9 | 1.0 | 5 | 2.0 | 15.8 |
| 60 | 55 | 2.5 | 2.1 | 13 | 2.2 | 4.5 | 1.0 | 5 | 2.0 | 13.9 |
| 61 | 55 | 2.5 | 2.8 | 13 | 3.4 | 4.5 | 1.0 | 5 | 2.9 | 13.9 |
| 62 | 55 | 2.5 | 2.2 | 18 | 3.4 | 3.1 | 1.0 | 5 | 2.0 | 15.3 |
| 63 | 55 | 2.5 | 2.5 | 18 | 2.9 | 3.1 | 1.0 | 5 | 2.5 | 15.3 |
| 64 | 55 | 2.5 | 2.4 | 18 | 2.2 | 3.1 | 1.0 | 5 | 2.9 | 15.3 |
| 65 | 55 | 2.5 | 2.8 | 13 | 3.4 | 4.5 | 1.0 | 5 | 2.9 | 13.9 |
| 66 | 55 | 2.5 | 2.1 | 18 | 2.1 | 3.1 | 1.0 | 5 | 2.0 | 15.3 |
| 67 | 55 | 2.5 | 2.6 | 17 | 2.9 | 2.9 | 1.0 | 5 | 2.9 | 15.8 |
| 68 | 55 | 2.5 | 2.4 | 18 | 3.4 | 3.1 | 1.0 | 5 | 2.0 | 15.3 |
| 69 | 55 | 2.5 | 2.5 | 17 | 2.1 | 2.9 | 1.0 | 5 | 2.9 | 15.8 |
| 70 | 55 | 2.5 | 2.7 | 18 | 3.3 | 3.1 | 1.0 | 5 | 2.9 | 15.3 |
| 71 | 55 | 2.5 | 2.2 | 17 | 3.8 | 2.9 | 1.0 | 5 | 2.0 | 15.8 |
| 72 | 55 | 2.5 | 2.9 | 17 | 3.8 | 2.9 | 1.0 | 5 | 2.9 | 15.8 |

[1]Cationic functionality (mole % based on monomer)
[2]Urea added to macroemulsion (wt. % based on emulsion blend)
[3]Standard Viscosity is messured in centipoise (cps)

Examples 73–93 demonstrate the utility of adding a stabilizer to blends of the current invention.

Examples 73–79

Stabilization of 40% Charge blends by addition of urea

Blends having an overall charge of 40% are prepared from 66.58 g of the microemulsion of Example 5 and 35.64 g of the macroemulsion of Example 18. For the samples containing urea, the appropriate amount of a 50% aqueous urea solution is added to the macroemulsion with stirring. The microemulsion was then added to this mixture with stirring to yield a stabilized blend. The resulting blends are stored at room temperature for the time periods indicated. Samples of the blends are withdrawn and the SV of the blend was measured.

TABLE 5

| Example | Urea[1] Content (wt. %) | Days @ 25° C. | Standard Viscosity (SV) (cps) |
|---|---|---|---|
| 73* | 0 | 0 | 2.8 |
|  |  | 7 | 1.9 |
|  |  | 65 | 1.9 |
| 74 | 1.25 | 0 | 2.6 |
|  |  | 65 | 2.8 |
| 75 | 2.50 | 0 | 2.4 |
|  |  | 65 | 2.4 |
| 76 | 3.75 | 0 | 2.6 |
|  |  | 65 | 2.6 |
| 77 | 5.0 | 0 | 3.0 |
|  |  | 65 | 3.4 |
| 78 | 10.0 | 0 | 2.9 |
|  |  | 42 | 3.1 |

[1]Urea Added to Macroemulsion (wt. % based on emulsion blend)
*Not representative of the invention for stable emulsion blends The data in Table 5 demonstrates that when a microemulsion containing quaternized Mannich PAM, which has been heat treated with acid and a formaldehyde scavenger, is blended with a macroemulsion comprising acrylamide/acryloxyethyltrimethyl ammonium halide copolymer (Example 18), the polymer in the resulting blend does not remain stable or loses it's ability to achieve the original standard viscosity of the fresh blend. But when an aldehyde scavenger (urea) is added to the macroemulsion prior to blending, the polymer in the blend remains stable. It is known that the standard viscosity of a polymer affects flocculation performance, as shown in Table 6, which provides sludge dewatering data for some of the emulsion blends tested in Table 5. The data in Table 6 demonstrates that the addition of a stabilizer to the blend allows the stabilized blend to maintain its performance efficacy while the unstabilized blend performance deteriorates substantially with time.

The efficiency of dewatering a typical municipal sludge is determined for Examples 73, 77 and 78 in Table 6 as follows: 200 gms of sludge are carefully weighed into a beaker. Aqueous solutions of the polymers and blends are prepared by adding the polymer emulsion sample to water so that the polymer concentration is 0.2 weight percent. Various doses of the polymer solution are added to the sludge samples, water is added to bring the total weight to 250 gms, the mixture is agitated at 1000 rpm for 5 seconds and the resulting flocculated sludge is poured through a Buchner funnel containing a 60 mesh screen. The free drainage is measured by recording the volume of filtrate collected in 10 seconds. The resulting flocculated sludge is further dewatered by pressing the sample under identical conditions. The pressed sludge is then dried to constant weight to determine the final sludge solids content, i.e. the cake solids.

TABLE 6

| Example | Urea Content (wt. %) | Age (stored at room temp.) | Dose (lb/ton) | Filtrate (mL) | Cake Solids % |
|---|---|---|---|---|---|
| 73* | 0 | fresh | 10.4 | 55 | — |
|  |  |  | 12.2 | 71 | 20.5 |
|  |  |  | 13.2 | 85 | 20.6 |
|  |  |  | 14.1 | 87 | 17.6 |
| 73* | 0 | 6 weeks | 14.1 | 45 | — |
|  |  |  | 18.8 | 93 | 19.6 |
|  |  |  | 19.8 | 65 | 19.5 |
|  |  |  | 20.7 | 74 | — |
|  |  |  | 23.5 | 75 | — |
| 77 | 5 | 6 weeks | 9.4 | 53 | — |
|  |  |  | 10.4 | 68 | 17.6 |
|  |  |  | 11.3 | 48 | 12.9 |
|  |  |  | 12.2 | 40 | — |
| 78 | 10 | 6 weeks | 10.35 | 66 | 18.3 |
|  |  |  | 10.82 | 74 | 18.7 |
|  |  |  | 11.29 | 62 | 18.0 |
|  |  |  | 12.24 | 40 | — |

[1]Urea added to macroemulsion (wt % based on blend)
*Not representative of the invention for stable emulsion blends Table 7 shows data obtained from an accelerated aging study carried out at 50° C. This data correlates with the data of Table 5 and is therefore representative of room temperature aging studies.

TABLE 7

| Example | Urea added to[1] macroemulsion (wt. %) | Days @ 50° C. | SV |
|---|---|---|---|
| 73* | 0 | 0 | 2.8 |
|  |  | 1 | 1.9 |
|  |  | 4 | 2.1 |
| 79 | 0.84 | 0 | 2.6 |
|  |  | 1 | 2.4 |
|  |  | 4 | 2.3 |
|  |  | 8 | 2.3 |
| 74 | 1.25 | 0 | 2.6 |
|  |  | 1 | 2.6 |
|  |  | 4 | 3.0 |
|  |  | 6 | 2.5 |
|  |  | 8 | 2.4 |
| 75 | 2.50 | 0 | 2.4 |
|  |  | 1 | 2.4 |
|  |  | 4 | 2.6 |
|  |  | 6 | 2.5 |
|  |  | 8 | 2.5 |
|  |  | 10 | 2.4 |
|  |  | 12 | 2.4 |
| 76 | 3.75 | 0 | 2.6 |
|  |  | 1 | 2.6 |
|  |  | 4 | 2.7 |
|  |  | 6 | 2.7 |
|  |  | 8 | 2.7 |
| 77 | 5.0 | 0 | 3.0 |
|  |  | 1 | 3.1 |
|  |  | 4 | 3.0 |
|  |  | 6 | 3.1 |

*Not representative of the invention for stable emulsion blends
[1](wt % based on emulsion blend)

Examples 80–82
Method Of Stabilizing Blends By Adding Urea To The Monomer Aqueous Phase Of The Macroemulsion Blends are prepared by adding the indicated amounts of the macroemulsion of Example 21 and the microemulsion of Example 5 to a beaker. The blend is mixed for a few minutes with the aid of a magnetic stirring bar. The blends are then aged at 50° C. for the indicated time periods. As indicated by the SV measurements, the urea in the macroemulsion is sufficient to stabilize the blends, as evidenced by no loss in SV over at least one week at 50° C. In contrast, the SV of a control blend (Example 82A), prepared identically except that no urea was added to the macroemulsion, dropped to 2.0 after aging for 1 day at 50° C.

TABLE 8

| Example | Macro-emulsion of Example 21 (grams) | Micro-emulsion of Example 5 (grams) | Blend Charge | Urea[1] Content (wt. %) | Days at 50° | SV (cps) |
|---|---|---|---|---|---|---|
| 80 | 108.35 | 41.35 | 20% | 5.6 | 0 | 2.87 |
| | | | | | 1 | 2.87 |
| | | | | | 4 | 2.79 |
| | | | | | 8 | 2.99 |
| | | | | | 11 | 3.21 |
| 81 | 54.95 | 95.05 | 40% | 2.9 | 0 | 2.82 |
| | | | | | 1 | 2.82 |
| | | | | | 4 | 2.77 |
| | | | | | 8 | 2.81 |
| | | | | | 11 | 2.84 |
| 82 | 19.42 | 80.58 | 55% | 1.5 | 0 | 2.49 |
| | | | | | 1 | 2.45 |
| | | | | | 4 | 2.52 |
| | | | | | 8 | 2.35 |
| | | | | | 11 | 1.82 |
| 82A* | 19.42 (macro-emulsion Example 18) | 80.58 | 55% | 0 | 0 | 2.5 |
| | | | | | 1 | 2.0 |

[1]Urea added to macroemulsion (wt. % based on emulsion blend)
*Not representative of the invention for stable emulsion blend Examples 82A–C Effect of Order of Addition of Blend Components on Blend Stability Stable emulsion blends were prepared at 55% overall charge by combining the microemulsion of Example 5 (80.6 g), the macroemulsion of Example 18 (19.4 g) and optionally a 50% aqueous urea solution (4.2 g). As shown in the Table 8A, the blends were prepared by adding either a microemulsion or macroemulsion to a vessel. To this was optionally added the aqueous urea solution over a period of 5 minutes with stirring. To this mixture the other emulsion was added and the resulting blend was stirred for 5 minutes. The control blend was unstable as evidenced by the loss in SV. Both of the stabilized blends maintained their SV after accelerated ageing. The data in Table A shows that the aldehyde scavenger may be added to either the microemulsion or the second emulsion (here macroemulsion) prior to blending the emulsions.

TABLE 8A

| Example Number | Urea Added (wt. % based on blend) | Order of Addition of Components | Original SV (cps) | SV after ageing 1 day at 50 |
|---|---|---|---|---|
| Control Example 82* | none | 1)Macroemulsion 2)Microemulsion | 2.6 | 2.1 |
| Example 82B | 2.0 | 1)Macroemulsion 2)Urea solution 3)Microemulsion | 2.6 | 2.7 |
| Example | 2.0 | 1)Microemulsion | 2.7 | 2.7 |

TABLE 8A-continued

| Example Number | Urea Added (wt. % based on blend) | Order of Addition of Components | Original SV (cps) | SV after ageing 1 day at 50 |
|---|---|---|---|---|
| 82C | | 2)Urea solution 3)Macroemulsion | | |

*Not representative of the invention for stable emulsion blends

Example 83

Stabilization of Lower Charge Microemulsion Blends By Adding Urea

Blends are prepared by adding the indicated amounts of the macroemulsion of Example 18, the microemulsion of Example 8 and a 50% urea solution with stirring. The overall total charge of the emulsion blend has a 24% cationic functionality, based on the monomer. The blends are then aged at 50° C. for the indicated time periods. As indicated by the SV measurements, the urea is sufficient to stabilize the blends containing the lower charged quaternized Mannich PAM.

TABLE 9

| Example | Macro-emulsion of Example 18 (grams) | Micro-emulsion of Example 8 (grams) | Urea 50% soln. (grams) | Urea[1] Content (wt. %) | Days at 50° C. | SV (cps) |
|---|---|---|---|---|---|---|
| 83 | 22.0 plus 0.5 g ethoxylated alcohol - 60% EO | 22.5 | 5.0 | 5.0 | 0 | 2.9 |
| | | | | | 1 | 2.9 |
| | | | | | 4 | 2.8 |
| | | | | | 8 | 2.0 |

[1]Urea added to blend (wt % based on emulsion blend)

Examples 84–87

Stabilization of the Macroemulsion of Example 18

The effectiveness of the aldehyde scavenger can be predicted using the following test. To the macroemulsion of Example 18 is added either: a) a compound (formaldehyde or glyoxal), capable of affecting the ability of the (alk) acrylamide-based polymer to achieve a flocculation effective viscosity in water, or b) the formaldehyde or glyoxal compound in (a) plus an aldehyde scavenger (urea). The mixtures are then heated for a period of time, inverted and their standard viscosities are measured. The results indicate that an aldehyde scavenger is capable of stabilizing formulations containing (alk)acrylamide-based polymer and formaldehyde or glyoxal. Since glyoxalated (alk)acrylamide microemulsions contain or generate glyoxal, an aldehyde scavenger would stabilize a blend of at least one microemulsion containing glyoxalated (alk)acrylamide polymer and at least one second emulsion containing an (alk)acrylamide-based polymer.

Example 88

Stabilization of Blends of the Microemulsion of Example 4

A stabilized blend is prepared by mixing 50 g of the microemulsion of Example 4, 50 g of the macroemulsion of Example 18 and 10 g of a 50% urea solution. The blend is allowed to age at room temperature for one month. The blend is inverted and the SV was 2.6 cps at a solution pH of 7. This is essentially unchanged from the SV of the blend when prepared and illustrates that urea is effective at stablizing blends of the non-heat-treated microemulsion of Example 4.

Examples 89–93

Stabilization of blends by addition of dimedone

Blends having an overall cationic charge of 40% (mole percent, based on monomer) were prepared from 66.58 g of the microemulsion of Example 5 and 35.64 g of the macroemulsion of Example 18. For the samples containing dimedone, the appropriate amount of dimedone is added to the macroemulsion with stirring. The microemulsion was then added to this mixture with stirring to yield a stabilized blend. The resulting blends are stored at 50° C. for the indicated time period. Samples of the blends are withdrawn and the SV of the blend is measured. The results indicated that dimedone(5,5-dimethyl-1,3-cyclohexyldione) is also effective at stabilizing the emulsion blends.

TABLE 10

| Example | Dimedone[1] (wt. %) | Days @ 50° C. | SV |
|---|---|---|---|
| 89* | 0 | 0 | 2.8 |
|  |  | 1 | 1.9 |
|  |  | 4 | 1.9 |
| 90 | 1.25 | 0 | 2.6 |
|  |  | 1 | 2.6 |
|  |  | 4 | 2.6 |
|  |  | 6 | 3.0 |
|  |  | 8 | 2.5 |
|  |  | 14 | 2.4 |
| 91 | 2.50 | 0 | 2.4 |
|  |  | 1 | 2.4 |
|  |  | 4 | 2.4 |
|  |  | 6 | 2.6 |
|  |  | 8 | 2.5 |
|  |  | 10 | 2.5 |
|  |  | 12 | 2.4 |
|  |  | 16 | 2.4 |
| 92 | 3.75 | 0 | 2.6 |
|  |  | 1 | 2.7 |
|  |  | 4 | 2.5 |
|  |  | 6 | 2.7 |
|  |  | 8 | 2.7 |
|  |  | 16 | 2.3 |
| 93 | 5.0 | 0 | 3.0 |
|  |  | 1 | 3.1 |
|  |  | 4 | 3.0 |
|  |  | 6 | 3.1 |

[1]Dimedone added to macroemulson (wt % based on emulsion blend)
*Not representative of the invention for stable emulsion blends

MULTIMODAL EMULSION BLEND VISCOSITY DATA

Examples 94–111 demonstrate that the instant process for preparing multimodal emulsions can conveniently provide for emulsion blends that display bulk viscosities that are lower than a weighted average of the two parent emulsions.

Example 94

Blends of the microemulsion of Example 5 containing a quaternary Mannich microemulsion and the low charge cationic macroemulsion of Example 18 were prepared. The blends have a lower viscosity than either the macroemulsion or microemulsion.

TABLE 11

| wt. % micro-emulsion in blend | Bulk Viscosity (cps)[2] |
|---|---|
| 0[1]* | 1740 |
| 10 | 1040 |
| 20 | 835 |
| 30 | 678 |
| 40 | 581 |
| 50 | 511 |
| 60 | 496 |
| 70 | 564 |
| 80 | 755 |
| 90 | 1090 |
| 100* | 2100 |

[1](100 wt % macroemulsion)
[2]measured using a Brookfield Viscometer LVT model #2 spindle, 12 rpm
*Not representative of the invention of preparing multimodal emulsion blends Examples 95–111

Blends Viscosity vs. Composition

A variety of blends of different inverse microemulsions and inverse macroemulsions are prepared. The polymer combinations include cationic/cationic, cationic/anionic and anionic/anionic polymer blends. Table 13 shows examples of these types of blends and the viscosity of the blends measured in centipoise at room temperature using a Brookfield viscometer using a #2 spindle and 12 rpm. The resulting blends are multimodal and advantageous in that they display a viscosity which is lower than that of a weighted average of the two parent inverse emulsions used to prepare the multimodal emulsion blends.

TABLE 12

| | Blend Type | | Weight Percent Microemulsion in the Blend | | | | |
|---|---|---|---|---|---|---|---|
| | Micro | | | | (viscosity - cps) | | |
| Example | emulsion of Example | Macro emulsion of Example | 100%* | 75% | 50% | 25% | 0* (100% macroemulsion) |
| 95 | 9 | 21 | 28 | 55 | 177 | 433 | 960 |
| 96 | 9 | 25 | 28 | 53 | 190 | 461 | 1380 |
| 97 | 9 | 22 | 28 | 65 | 259 | 615 | 4530 |
| 98 | 9 | 23 | 28 | 55 | 242 | 621 | 1650 |

TABLE 12-continued

| Example | Blend Type Microemulsion of Example | Macro emulsion of Example | Weight Percent Microemulsion in the Blend (viscosity - cps) | | | | |
|---|---|---|---|---|---|---|---|
| | | | 100%* | 75% | 50% | 25% | 0* (100% macroemulsion) |
| 99 | 9 | 24 | 28 | 53 | 197 | 504 | 1220 |
| 100 | 10 | 23 | 25 | 68 | 245 | 574 | 1650 |
| 101 | 10 | 21 | 25 | 43 | 98 | 292 | 960 |
| 102 | 10 | 22 | 25 | 70 | 329 | — | 4530[1] |
| 103 | 11 | 21 | 15 | 45 | 115 | 329 | 960 |
| 104 | 11 | 22 | 15 | 48 | 185 | 486 | 4530[1] |
| 105 | 12 | 21 | 15 | 60 | 234 | 539 | 960 |
| 106 | 5 | 25 | 2300 | 626 | 417 | 611 | 1380 |
| 107 | 5 | 22 | 2300 | 386 | 361 | 585 | 4530 |
| 108 | 5 | 19 | 2300 | 822 | 628 | 698 | 1100 |
| 109 | 5 | 23 | 2300 | 768 | 523 | 748 | 1650 |
| 110 | 5 | 20 | 2300 | 346 | 372 | 561 | 1070 |
| 111 | 5 | 24 | 2300 | 1010 | 625 | 748 | 1220 |

[1]#3 spindle used
*Not representative of the invention or preparing multimodal emulsion blends

Example 111A

Low Viscosity Emulsion Blend of two microemulsions

The microemulsion of Example 1 having a volume average droplet diameter of 650 Å, (as measured by transmission electron microscopy) and the microemulsion of Example 5 having a volume average droplet diameter of about 1000 Å are blended together as indicated below. The resulting blend is a multimodal emulsion blend which has a viscosity which is less than that predicted by a weighted average of the starting emulsion viscosities.

TABLE 13

| Blend Composition (wt. %) | | Blend Viscosity |
|---|---|---|
| Ex. 1 | Ex. 5 | [1](cps) |
| 100 | 0 | 28 |
| 75 | 25 | 45 |
| 50 | 50 | 78 |
| 25 | 75 | 249 |
| 0 | 100 | 1260 |

[1]Brookfield Viscometer, LVT model with UL adapter 12 rpm

Examples 112–118 demonstrate the performance utility of various stable multimodal emulsion blends.

Examples 112–188

The efficiency of dewatering a typical municipal sludge is determined in Examples 112–118 as follows: 200 gms of sludge are carefully weighed into a beaker. Aqueous solutions of the polymers and blends are prepared by adding the polymer emulsion sample to water so that the polymer concentration is 0.2 weight percent. Various doses of the polymer solution are added to the sludge samples, water is added to bring the total weight to 250 gms, the mixture is agitated at 1000 rpm for 5 seconds and the resulting flocculated sludge is poured through a Buchner funnel containing a 60 mesh screen. The free drainage is measured by recording the volume of filtrate collected in 10 seconds. The resulting flocculated sludge is further dewatered by pressing the sample under identical conditions. The pressed sludge is then dried to constant weight to determine the final sludge solids content, i.e. the cake solids.

As demonstrated by the data in Examples 112–118, the stable multimodal emulsion blends of Examples 114, 115, 116 and 117 exhibited improved flocculation performance compared to single macroemulsions containing polymers of similar charge.

Example 112

Performance of 55% Charge Blends on Typical Municipal Sludge #2

TABLE 14

| Blend of Example | Control of Example | Dose(mL) | Filtrate (mL) | Cake Solids (%) |
|---|---|---|---|---|
| 30 | | 10 | 130 | 27.3 |
| | | 12 | 148 | 29.7 |
| | | 14 | 158 | 28.7 |
| | | 16 | 165 | 30.1 |
| | 15* | 10 | 140 | 28.4 |
| | | 12 | 152 | 30.8 |
| | | 14 | 148 | 28.6 |
| | | 16 | 150 | 27.1 |

*Not representative of the invention for preparing multimodal emulsion blends or the invention for stable emulsion blends

Example 113

Example Performance of 55% Charge Blends on Typical Municipal Sludge #3

TABLE 15

| Blend Example | Control of Example | Dose(mL) | Filtrate (mL) | Cake Solids (%) |
|---|---|---|---|---|
| 30 | | 16 | 103 | 19.8 |
| | | 18 | 135 | 20.3 |
| | | 19 | 135 | 20.4 |
| | | 20 | 147 | 19.0 |
| | | 22 | 148 | 19.2 |
| | 27 | 16 | 128 | 19.1 |
| | | 18 | 143 | 18.9 |

TABLE 15-continued

| Blend Example | Control of Example | Dose(mL) | Filtrate (mL) | Cake Solids (%) |
|---|---|---|---|---|
| 33 | | 20 | 137 | 19.6 |
| | | 18 | 74 | 19.7 |
| | | 22 | 126 | 20.4 |
| | | 24 | 137 | 21.1 |
| | 15* | 16 | 68 | 19.6 |
| | | 18 | 141 | 19.2 |
| | | 20 | 152 | 18.6 |
| | | 22 | 151 | 18.4 |

*Not representative of the invention for preparing multimodal emulsion blends or the invention for stable emulsion blends

Example 114

Performance of 20% Charge Blends on Typical Paper Sludge

Tested with an agitation 500 rpm for 5 seconds. Filtrate quality is assessed by measuring clarity, in NTU with a Hach turbidimeter.

TABLE 16

| Blend Example | Control of Example | Dose (mL) | Filtrate (mL) | Turbidity (NTU) |
|---|---|---|---|---|
| 44 | | 9 | 106 | 141 |
| | | 12 | 126 | 38 |
| | | 15 | 122 | 76 |
| | | 18 | 124 | 50 |
| 45 | | 9 | 114 | 180 |
| | | 12 | 140 | 44 |
| | | 15 | 142 | 33 |
| | | 18 | 148 | 44 |
| 46 | | 9 | 118 | 191 |
| | | 12 | 138 | 40 |
| | | 15 | 148 | 30 |
| | | 18 | 138 | 43 |
| 49 | | 9 | 100 | 294 |
| | | 12 | 134 | 54 |
| | | 15 | 148 | 35 |
| | | 18 | 146 | 44 |
| | 13* | 9 | 50 | >500 |
| | | 12 | 102 | 164 |
| | | 15 | 138 | 83 |
| | | 18 | 144 | 47 |

*Not representative of the invention for preparing multimodal emulsion blends or the invention for stable emulsion blends

Example 115

Performance of 55% Charge Blends on Municipal Sludge #4

TABLE 17

| Blend of Example | Control of Example | Dose (mL) | Filtrate (mL) | Cake Solids (%) |
|---|---|---|---|---|
| 30 | | 12 | 92 | 24 |
| | | 14 | 136 | 22 |
| | | 16 | 150 | 22 |
| | | 18 | 148 | 23 |
| | 15* | 12 | 72 | 24 |
| | | 14 | 104 | 24 |
| | | 16 | 125 | 27 |
| | | 18 | 148 | 23 |

*Not representative of the invention for preparing multimodal emulsion blends or the invention for stable emulsion blends

Example 116

Performance of 55% Charge Blends on Municipal Sludge #5

TABLE 18

| Blend of Example | Control of Example | Dose (mL) | Filtrate (mL) | Cake Solids (%) |
|---|---|---|---|---|
| 30 | | 18 | 84 | 17 |
| | | 20 | 116 | 16 |
| | | 22 | 127 | 16 |
| | | 24 | 110 | 17 |
| | 15* | 18 | 98 | 16 |
| | | 20 | 108 | 17 |
| | | 22 | 104 | 16 |
| | | 24 | 106 | 17 |

*Not representative of the invention for preparing multimodal emulsion blends or the invention for stable emulsion blends

Example 117

Performance of 20% Charge Blends on Municipal Sludge #6

TABLE 19

| Blend of Example | Control of Example | Dose (mL) | Filtrate (mL) | Turbidity (NTU) |
|---|---|---|---|---|
| 44 | | 5 | 56 | 765 |
| | | 6 | 74 | 432 |
| | | 7 | 76 | 284 |
| | | 8 | 88 | 183 |
| | | 9 | 88 | 110 |
| | | 10 | 90 | 111 |
| | | 12 | 88 | 98 |
| 45 | | 5 | 50 | >1000 |
| | | 6 | 58 | 678 |
| | | 7 | 56 | 440 |
| | | 8 | 66 | 309 |
| | | 9 | 70 | 256 |
| | | 10 | 84 | 159 |
| | | 12 | 106 | 98 |
| | | 14 | 94 | 112 |
| | 13* | 5 | 54 | >1000 |
| | | 6 | 66 | 581 |
| | | 7 | 72 | 363 |
| | | 8 | 88 | 210 |
| | | 9 | 100 | 123 |
| | | 10 | 94 | 83 |
| | | 12 | 100 | 43 |

*Not representative of the invention for preparing multimodal emulsion blends or the invention for stable emulsion blends

Example 118

Preparation And Performance of Blends

Blends in Example 110 are prepared by mixing the emulsion of Examples 5 and 20, then stabilized by urea at a level of 1.5–2.0%, and tested using typical sludge #7. Example 110 and 30 blends show effective performance comparable to the emulsions used to prepare the emulsion blend 110.

TABLE 20

| Blend Example | Control of Example | Dose (mL) | Filtrate (mL) | Turbidity (NTU) |
|---|---|---|---|---|
| 110 | | 8 | 88 | — |
| Micro/Macro = 1/1 g/g | | 10 | 125 | 22 |
| | | 12 | 129 | 22 |
| | | 14 | 120 | — |
| 110 | | 8 | 87 | — |
| Micro/Macro = 1/3 g/g | | 10 | 125 | 20 |
| | | 12 | 135 | 22 |
| | | 13 | 124 | 22 |
| | | 14 | 133 | — |
| 30 | | 8 | 77 | — |
| | | 10 | 125 | 22 |
| | | 12 | 131 | 23 |
| | | 14 | 129 | 24 |
| | 5* | 8 | 82 | — |
| | | 10 | 124 | 22 |
| | | 12 | 136 | 22 |
| | | 14 | 121 | 21 |
| | | 16 | 120 | 21 |
| | | 18 | 105 | 20 |
| | 20* | 8 | 77 | — |
| | | 10 | 121 | 21 |
| | | 12 | 132 | 23 |
| | | 14 | 117 | — |

*Not representative of the invention for preparing multimodal emulsion blends or the invention for stable emulsion blends The preceding examples can be repeated with similar results by substituting the generically or specifically described reactions and/or operating conditions of this invention for those used in the preceding examples.

From the foregoing description, one skilled in the art can easily ascertain the essential characteristics of this invention and without departing from the spirit or scope of the invention, can make various modifications of the invention to adapt it to various applications.

We claim:

1. A process for preparing a multimodal polymeric emulsion which comprises:
    (a) preparing at least one inverse microemulsion comprising a continuous phase and a water-swellable or water-soluble addition polymer-containing discontinuous phase in the form of droplets having a volume average droplet diameter; wherein said microemulsion comprises surfactant having a total hydrophilic-lypophylic balance of from about 8 to about 12 and having total concentration of from about 8% to about 25% by weight based on said microemulsion;
    (b) preparing at least one second emulsion comprising a continuous phase and a water-swellable or water-soluble addition polymer-containing discontinuous phase in the form of droplets having a volume average diameter which is greater than the volume average diameter of the droplets in the microemulsion, wherein said polymer in said second emulsion is different than said polymer in said microemulsion; and
    (c) admixing said microemulsion from step (a) and second emulsion from step (b).

2. A process according to claim 1 wherein the volume average droplet diameter of the droplets in said second emulsion is at least about 300 Å greater than the volume average droplet diameter of the droplets in said microemulsion.

3. A process according to claim 1 wherein the second emulsion is a macroemulsion.

4. A process according to claim 1 wherein said polymer in said microemulsion is cationic.

5. A process according to claim 1 wherein said polymer in said microemulsion is anionic.

6. A process according to claim 1 wherein said polymer in said microemulsion is:
    (a) a cationic polymer containing monomeric units selected from: quaternary dialkyl aminomethyl (alk) acrylamide; dialkyl aminomethyl (alk)acrylamide; quaternary dialkylaminoalkyl (meth)acrylates; quaternary dialkylaminoalkyl (meth)acrylamides; dialkylaminoalkyl (meth)acrylates; dialkylaminoalkyl (meth) acrylamides; diallyldialkylammonium halides and copolymers thereof with (alk)acrylamide;
    (b) an anionic polymer selected from: a copolymer of (alk)acrylamide with one or more anionic monomers selected from acrylic acid, methacrylic acid, their ammonium or alkali metal salts; vinyl sulfonic acid and 2-acrylamidoalkylsulfonic acids and their salts; and homopolymers of (meth)acrylic acid, acrylic acid, vinyl sulfonic acid, 2-acrylamido-alkylsulfonic acids or their salts; or
    (c) a nonionic polymer containing monomeric units selected from acrylamide and methacrylamide.

7. A process according to claim 1 wherein the ratio of microemulsion to second emulsion ranges from about 95:5 parts microemulsion to second emulsion to about 5:95 parts microemulsion to second emulsion.

8. A process according to claim 1 wherein:
    said polymer in said microemulsion is a water-soluble polymer- based polymer having functional groups which are capable of continually crosslinking at ambient conditions.

9. A process according to claim 8 wherein the volume average droplet diameter of the droplets in said second emulsion is at least about 300 Å greater than the volume average droplet diameter of the droplets in said microemulsion.

10. A process according to claim 8 wherein the second emulsion is a macroemulsion.

11. A process according to claim 8 wherein the water-soluble polymer-based polymer in said microemulsion is a vinylic addition polymer containing monomeric units selected from acrylamide; glyoxalated (alk)acrylamide; an hydroxyalkyl(alk)acrylate, an N,N-dialkylaminoalkyl(alk) acrylate and an allyl amine.

12. A process for preparing a multimodal polymeric emulsion which comprises:
    (a) preparing at least one inverse microemulsion comprising a continuous phase and a water-soluble addition polymer-containing discontinuous phase in the form of droplets having a volume average droplet diameter; said polymer in said microemulsion being a dialkyl aminomethyl (alk)acrylamide polymer or quaternized product thereof; wherein said microemulsion comprises surfactant having a total hydrophilic-lypophylic balance of from about 8 to about 12 and having total concentration of from about 8% to about 25% by weight based on said microemulsion;
    (b) preparing at least one second emulsion comprising a continuous phase and a water-swellable or water-soluble addition polymer-containing discontinuous phase in the form of droplets having a volume average diameter which is greater than the volume average diameter of the droplets in the microemulsion, wherein said polymer in said second emulsion is different than said polymer in said microemulsion; and
    (c) admixing said microemulsion from step (a) and second emulsion from step (b).

13. A process according to claim 12 wherein the volume average droplet diameter of the droplets in said second emulsion is at least about 300 Å greater than the volume average droplet diameter of the droplets in said microemulsion.

14. A process according to claim 12 wherein the second emulsion is a macroemulsion.

15. A process according to claim 12 wherein the polymer in said second emulsion is:
   (a) an anionic polymer selected from:
      a copolymer of (alk)acrylamide with one or more anionic monomers selected from acrylic acid, methacrylic acid, and their alkali metal or ammonium salts; vinyl sulfonic acid; acrylamido-2-methyl propanesulfonic acid and their salts; and
      homopolymers of (meth)acrylic acid, acrylic acid, vinyl sulfonic acid or acrylamido-2-methyl propanesulfonic acid; or
   (b) a nonionic polymer containing monomeric units selected from:
      acrylamide and methacrylamide.

16. A process according to claim 12 wherein the polymer in said second emulsion is a cationic polymer containing monomeric units selected from quaternary dialkyl aminomethyl (alk)acrylamides, dialkyl aminomethyl (alk)acrylamides; quaternary dialkylaminoalkyl (meth)acrylates; quaternary dialkylaminoalkyl (meth)acrylamides; dialkylaminoalkyl (meth)acrylates; dialkylaminoalkyl (meth)acrylamides; diallyldialkylammonium halides and copolymers thereof with (alk)acrylamide.

17. A process according to claim 16 wherein the volume average droplet diameter of the droplets in said second emulsion is at least about 300 Å greater than the volume average droplet diameter of the droplets in said microemulsion.

18. A process according to claim 16 wherein the polymer in said microemulsion is a dialkyl aminomethyl (alk)acrylamide polymer or quaternized product thereof containing from about 20 to about 100 mole percent cationic functionality, and the cationic polymer in said second emulsion contains from about 1 to about 60 mole percent cationic functionality.

19. A process for preparing a multimodal polymeric emulsion which comprises:
   (a) preparing at least one inverse microemulsion comprising a continuous phase and a water-soluble polymer-containing discontinuous phase in the form of droplets having a volume average droplet diameter; said polymer in said microemulsion being a dialkyl aminomethylated (alk)acrylamide polymer or quaternized product thereof; wherein said microemulsion comprises surfactant having a total hydrophilic-lypophylic balance of from about 8 to about 12 and having total concentration of from about 8% to about 25% by weight based on said microemulsion;
   (b) preparing at least one second macroemulsion comprising a continuous phase and a water-swellable or water-soluble polymer-containing discontinuous phase in the form of droplets having a volume average diameter which is at least about 300 Å greater than the volume average diameter of the droplets in the microemulsion; said polymer in said macroemulsion being a copolymer of acrylamide and (meth)acryloyloxyethyltrimethyl ammonium salt; and
   (c) admixing said microemulsion from step (a) and second emulsion from step (b).

20. A process according to claim 19 wherein the dialkyl aminomethyl (alk)acrylamide polymer or quaternary derivative thereof contains form about 20 to about 100 mole percent cationic functionality, and the copolymer of (alk)acrylamide and (meth)acryloyloxyethyltrimethyl ammonium salt contains from about 1 to about 60 mole percent cationic functionality.

21. A process according to claim 19 wherein the dialkyl aminomethyl (alk)acrylamide polymer or quaternized product thereof contains from about 60 to about 90 mole percent cationic functionality, and the copolymer of (alk)acrylamide and methacryloyloxyethyltrimethylammonium salt contains from about 1 to about 20 mole percent cationic functionality.

22. A composition comprising
   a blend of at least one inverse microemulsion, said microemulsion comprising a continuous phase and a water-swellable or water-soluble addition polymer-containing discontinuous phase in the form of droplets having a volume average droplet diameter; and
   at least one second emulsion comprising a continuous phase and a water-swellable or water-soluble addition polymer-containing discontinuous phase in the form of droplets having a volume average diameter which is greater than the volume average diameter of the droplets in the microemulsion; wherein said microemulsion comprises surfactant having a total hydrophilic-lypophylic balance of from about 8 to about 12 and having total concentration of from about 8% to about 25% by weight based on said microemulsion and wherein said polymer in said second emulsion is different than said polymer in said microemulsion.

23. A composition according to claim 22 wherein the volume average droplet diameter of the droplets in said second emulsion is at least about 300 Å greater than the volume average droplet diameter of the droplets in said microemulsion.

24. A composition according to claim 22 wherein the second emulsion is a macroemulsion.

25. A composition according to claim 22 wherein said polymer in said microemulsion is cationic.

26. A composition according to claim 22 wherein said polymer in said microemulsion is anionic.

27. A composition according to claim 22 wherein said polymer in said microemulsion is:
   (a) a cationic polymer containing monomeric units selected from: quaternary dialkyl aminomethyl (alk)acrylamide; dialkyl aminomethyl (alk)acrylamide; quaternary dialkylaminoalkyl (meth)acrylates; quaternary dialkylaminoalkyl (meth)acrylamides; dialkylaminoalkyl (meth)acrylates; dialkylaminoalkyl (meth)acrylamides; diallyldialkylammonium halides and copolymers thereof with (alk)acrylamide;
   (b) an anionic polymer selected from: a copolymer of (alk)acrylamide with one or more anionic monomers selected from acrylic acid, methacrylic acid, their ammonium or alkali metal salts; vinyl sulfonic acid and 2-acrylamidoalkylsulfonic acid and their salts; and homopolymers of (meth)acrylic acid, acrylic acid, vinyl sulfonic acid, 2-acrylamido-alkylsulfonic acid or their salts; or
   (c) a nonionic polymer containing monomeric units selected from: acrylamide and methacrylamide.

28. A composition according to claim 22 wherein the ratio of microemulsion to second emulsion ranges from about 95:5 parts microemulsion to second emulsion to about 5:95 parts microemulsion to second emulsion.

29. A composition according to claim 22 wherein:

said polymer in said microemulsion is a water-soluble polymer-based polymer having functional groups which are capable of continually crosslinking at ambient conditions.

30. A composition according to claim 29 wherein the volume average droplet diameter of the droplets in said second emulsion is at least about 300 Å greater than the volume average droplet diameter of the droplets in said microemulsion.

31. A composition according to claim 29 wherein the second emulsion is a macroemulsion.

32. A composition according to claim 29 wherein the water-soluble polymer-based polymer in said microemulsion is a vinylic addition polymer containing monomeric units selected from acrylamide; glyoxalated (alk)acrylamide; an hydroxyalkyl(alk)acrylate, an N,N-dialkylaminoalkyl(alk)acrylate and an allyl amine.

33. A composition comprising a blend of at least one inverse microemulsion, said microemulsion comprising a continuous phase and a water-soluble addition polymer-containing discontinuous phase in the form of droplets having a volume average droplet diameter; said polymer in said microemulsion being a dialkyl aminomethyl (alk)acrylamide polymer or quaternized product thereof; and said microemulsion comprising surfactant having a total hydrophilic-lypophylic balance of from about 8 to about 12 and having total concentration of from about 8% to about 25% by weight based on said microemulsion; and at least one second emulsion comprising a continuous phase and a water-swellable or water-soluble addition polymer-containing discontinuous phase in the form of droplets having a volume average diameter which is greater than the volume average diameter of the droplets in the microemulsion, wherein said polymer in said second emulsion is different than said polymer in said micoemulsion.

34. A composition according to claim 33 wherein the volume average droplet diameter of the droplets in said second emulsion is at least about 300 Å greater than the volume average droplet diameter of the droplets in said microemulsion.

35. A composition according to claim 33 wherein the second emulsion is a macroemulsion.

36. A composition according to claim 33 wherein the polymer in said second emulsion is:

(a) an anionic polymer selected from:
 a copolymer of (alk)acrylamide with one or more anionic monomers selected from acrylic acid, methacrylic acid, and their alkali metal or ammonium salts; vinyl sulfonic acid acrylamido-2-methyl propanesulfonic acid and their salts; and homopolymers of (meth)acrylic acid, acrylic acid, vinyl sulfonic acid or acrylamido-2-methyl propanesulfonic acid; or (b) a nonionic polymer containing monomeric units selected from:
 acrylamide and methacrylamide.

37. A composition according to claim 33 wherein the polymer in said second emulsion is a cationic polymer containing monomeric units selected from quaternary dialkyl aminomethyl (alk)acrylamides, dialkyl aminomethyl (alk)acrylamides; quaternary dialkylaminoalkyl (meth)acrylates; quaternary dialkylaminoalkyl (meth)acrylamides; dialkylaminoalkyl (meth)acrylates; dialkylaminoalkyl (meth)acrylamides; diallyldialkylammonium halides and copolymers thereof with (alk)acrylamide.

38. A composition according to claim 37 wherein the volume average droplet diameter of the droplets in said second emulsion is at least about 300 Å greater than the volume average droplet diameter of the droplets in said microemulsion.

39. A composition according to claim 37 wherein the polymer in said microemulsion is a dialkyl aminomethyl (alk)acrylamide polymer or quaternized product thereof containing from about 20 to about 100 mole percent cationic functionality, and the cationic polymer in said second emulsion contains from about 1 to about 60 mole percent cationic functionality.

40. A composition comprising a blend of at least one inverse microemulsion, said microemulsion comprising a continuous phase and a water-soluble polymer-containing discontinuous phase in the form of droplets having a volume average droplet diameter; said polymer in said microemulsion being a dialkyl aminomethyl (alk)acrylamide polymer or quaternized product thereof; and at least one second macroemulsion comprising a continuous phase and a water-swellable or water-soluble polymer-containing discontinuous phase in the form of droplets having a volume average diameter which is at least about 300 Å greater than the volume average diameter of the droplets in the microemulsion; said polymer in said macroemulsion being a copolymer of acrylamide and (meth)acryloyloxyethyltrimethylammonium salt; and said microemulsion comprising surfactant having a total hydrophilic-lypophylic balance of from about 8 to about 12 and having total concentration of from about 8% to about 25% by weight based on said microemulsion.

41. A composition according to claim 40 wherein said dialkyl aminomethyl (alk)acrylamide polymer or quaternized product thereof contains from about 20 to about 100 mole percent cationic functionality, and the copolymer of (alk)acrylamide and (meth)acryloyloxyethyltrimethylammonium salt contains from about 1 to about 60 mole percent cationic functionality.

42. A composition according to claim 40 wherein the dialkyl aminomethyl (alk)acrylamide polymer or quaternized product thereof contains from about 60 to about 90 mole percent cationic functionality, and the copolymer of (alk)acrylamide and methacryloyloxyethyltrimethylammonium salt contains from about 1 to about 20 mole percent cationic functionality.

* * * * *